(12) United States Patent
Moon et al.

(10) Patent No.: US 7,190,522 B2
(45) Date of Patent: *Mar. 13, 2007

(54) CHEMICAL SYNTHESIS USING DIFFRACTION GRATING-BASED ENCODED OPTICAL ELEMENTS

(75) Inventors: John Moon, Wallingford, CT (US); Martin A. Putnam, Cheshire, CT (US)

(73) Assignee: CyVera Corporation, Wallingford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/661,254

(22) Filed: Sep. 12, 2003

(65) Prior Publication Data

US 2004/0130761 A1    Jul. 8, 2004

Related U.S. Application Data

(63) Continuation-in-part of application No. 10/645,689, filed on Aug. 20, 2003, and a continuation-in-part of application No. 10/645,686, filed on Aug. 20, 2003.

(60) Provisional application No. 60/410,541, filed on Sep. 12, 2002.

(51) Int. Cl.
    *G02B 5/18* (2006.01)

(52) U.S. Cl. .......... 359/569; 435/288.7; 436/518

(58) Field of Classification Search .......... 359/2, 359/566, 569, 558, 571, 572; 356/72, 73.1; 385/12, 128, 37; 250/559.04, 559.11, 559.4, 250/227.14, 227.29, 566, 568; 235/473; 435/4, 6, 228.7, 518, 524, 525, 526, 527, 435/528; 436/518, 524, 525, 526, 527, 528, 436/531
See application file for complete search history.

(56) References Cited

U.S. PATENT DOCUMENTS

| | | | |
|---|---|---|---|
| 3,968,476 A | 7/1976 | McMahon | 382/127 |
| 4,011,435 A | 3/1977 | Phelps | 235/454 |
| 4,023,010 A | 5/1977 | Horst et al. | 235/454 |
| 4,053,228 A | 10/1977 | Schiller | 356/71 |
| 4,131,337 A | 12/1978 | Moraw et al. | 357/2 |
| 4,386,274 A | 5/1983 | Altshuler | 250/251 |
| 4,445,229 A | 4/1984 | Tasto et al. | 381/110 |

(Continued)

FOREIGN PATENT DOCUMENTS

EP    1219979    7/2002

(Continued)

OTHER PUBLICATIONS

Raman Kashyap, Fiber Bragg Gratings, Academic Press, Chapter 9, pp. 430-434.

(Continued)

*Primary Examiner*—Arnel Lavarias

(57) ABSTRACT

An optical identification element having a synthesized chemical attached thereto includes an optical substrate having at least one diffraction grating disposed therein, the grating having a resultant refractive variation at a grating location, said grating being embedded within a substantially single material of said optical substrate; the grating providing an output optical signal indicative of a code when illuminated by an incident light signal propagating in free space, the code identifying at least one of the element and the chemical, the output signal not being a result of laser action with the grating when illuminated by said incident light signal; and the synthesized chemical being attached to the substrate.

57 Claims, 14 Drawing Sheets

Illustration(a)

Illustration(b)

Illustration(c)

U.S. PATENT DOCUMENTS

| | | | |
|---|---|---|---|
| 4,537,504 A * | 8/1985 | Baltes et al. ................... 356/71 |
| 4,560,881 A | 12/1985 | Briggs ..................... 250/458.1 |
| 4,562,157 A | 12/1985 | Lowe et al. .............. 435/287.2 |
| 4,647,544 A | 3/1987 | Nicoli et al. ................ 436/518 |
| 4,678,752 A | 7/1987 | Thorne et al. ............ 435/287.3 |
| 4,685,480 A | 8/1987 | Eck ............................ 134/182 |
| 4,740,688 A | 4/1988 | Edwards ..................... 250/226 |
| 4,748,110 A | 5/1988 | Paul .............................. 435/5 |
| 4,767,719 A | 8/1988 | Finlan ........................ 436/501 |
| 4,816,659 A | 3/1989 | Bianco et al. .......... 235/462.21 |
| 4,841,140 A | 6/1989 | Sullivan et al. ............. 250/226 |
| 4,877,747 A | 10/1989 | Stewart ....................... 436/525 |
| 4,880,752 A | 11/1989 | Keck et al. ................. 435/7.72 |
| 4,882,288 A | 11/1989 | North et al. ................ 436/525 |
| 4,921,805 A | 5/1990 | Gebeyehu et al. .......... 435/270 |
| 4,931,384 A | 6/1990 | Layton et al. .............. 435/7.31 |
| 4,958,376 A | 9/1990 | Leib ............................ 382/210 |
| 4,992,385 A | 2/1991 | Godfrey ..................... 436/525 |
| 5,003,600 A | 3/1991 | Deason ......................... 380/54 |
| RE33,581 E | 4/1991 | Nicoli et al. ................. 435/7.2 |
| 5,033,826 A | 7/1991 | Kolner ........................ 352/245 |
| 5,067,155 A | 11/1991 | Bianco et al. .............. 713/185 |
| 5,081,012 A | 1/1992 | Flanagan et al. ............ 435/7.9 |
| 5,089,387 A | 2/1992 | Tsay et al. ..................... 435/6 |
| 5,095,194 A | 3/1992 | Barbanell .................... 235/379 |
| 5,100,238 A | 3/1992 | Nailor et al. ................ 356/246 |
| 5,115,121 A | 5/1992 | Bianco et al. .......... 235/462.25 |
| 5,118,608 A | 6/1992 | Layton et al. ............... 435/7.1 |
| 5,138,468 A | 8/1992 | Barbanell ...................... 359/2 |
| 5,141,848 A | 8/1992 | Donovan et al. ............... 435/5 |
| 5,144,461 A | 9/1992 | Horan .......................... 359/30 |
| 5,166,813 A | 11/1992 | Metz ........................... 359/15 |
| 5,196,350 A | 3/1993 | Backman et al. ........... 436/501 |
| 5,200,794 A | 4/1993 | Nishiguma et al. ........... 356/71 |
| 5,291,006 A | 3/1994 | Hishiguma et al. ......... 235/454 |
| 5,291,027 A | 3/1994 | Kita et al. ................... 250/566 |
| 5,300,764 A | 4/1994 | Hoshino et al. ............. 235/487 |
| 5,310,686 A | 5/1994 | Sawyers et al. ............. 436/518 |
| 5,349,442 A | 9/1994 | Deason et al. .............. 356/521 |
| 5,352,582 A | 10/1994 | Lichtenwalter et al. ......... 435/6 |
| 5,364,797 A | 11/1994 | Olson et al. ................. 436/501 |
| 5,374,816 A | 12/1994 | Bianco ........................ 235/459 |
| 5,374,818 A | 12/1994 | Bianco et al. ............... 235/492 |
| 5,394,234 A | 2/1995 | Bianco et al. ................. 356/71 |
| 5,442,433 A | 8/1995 | Hoshino et al. ............... 356/71 |
| 5,448,659 A | 9/1995 | Tsutsui et al. ................ 385/14 |
| 5,451,528 A | 9/1995 | Raymoure et al. .......... 436/533 |
| 5,461,475 A | 10/1995 | Lerner et al. ............... 356/300 |
| 5,465,176 A | 11/1995 | Bianco et al. ............... 359/567 |
| 5,468,649 A | 11/1995 | Shah et al. .................. 436/518 |
| 5,506,674 A | 4/1996 | Inoue et al. ................ 356/73.1 |
| 5,514,785 A | 5/1996 | Van Ness et al. .......... 536/22.1 |
| 5,528,045 A | 6/1996 | Hoffman et al. .......... 250/458.1 |
| 5,547,849 A | 8/1996 | Baer et al. .................. 435/7.24 |
| 5,559,613 A | 9/1996 | Deveaud-Pledran et al. ... 359/4 |
| 5,585,639 A | 12/1996 | Dorsel et al. ............. 250/458.1 |
| 5,607,188 A | 3/1997 | Bahns et al. ................. 283/113 |
| 5,621,515 A | 4/1997 | Hoshino ........................ 356/71 |
| 5,627,040 A | 5/1997 | Bierre et al. ............... 435/7.24 |
| 5,627,663 A | 5/1997 | Horan et al. ................... 359/2 |
| 5,633,724 A | 5/1997 | King et al. .................. 356/445 |
| 5,663,790 A | 9/1997 | Ekstrom et al. ............. 356/128 |
| 5,667,976 A | 9/1997 | Van Ness et al. ................ 435/6 |
| 5,671,308 A | 9/1997 | Inoue et al. ................... 385/37 |
| 5,712,912 A | 1/1998 | Tomko et al. ............... 713/186 |
| 5,721,435 A | 2/1998 | Troll ....................... 250/559.29 |
| 5,729,365 A | 3/1998 | Sweatt .......................... 359/2 |
| 5,736,330 A | 4/1998 | Fulton ........................... 435/6 |
| 5,742,432 A | 4/1998 | Bianco ........................ 359/566 |
| 5,745,615 A | 4/1998 | Atkins et al. ................. 385/37 |
| 5,759,778 A | 6/1998 | Li et al. ......................... 435/6 |
| 5,760,961 A | 6/1998 | Tompkin et al. ............. 359/576 |
| 5,766,956 A | 6/1998 | Groger et al. ............... 436/164 |
| 5,793,502 A | 8/1998 | Bianco et al. .................. 359/2 |
| 5,798,273 A | 8/1998 | Shuler et al. ................ 436/514 |
| 5,799,231 A | 8/1998 | Gates et al. ................. 399/115 |
| 5,801,857 A | 9/1998 | Heckenkamp et al. .......... 359/2 |
| 5,804,384 A | 9/1998 | Muller et al. ................... 435/6 |
| 5,822,472 A | 10/1998 | Danielzik et al. ............. 385/12 |
| 5,824,478 A | 10/1998 | Muller .......................... 435/6 |
| 5,824,557 A | 10/1998 | Burke et al. .................. 436/94 |
| 5,831,698 A | 11/1998 | Depp et al. ................... 349/64 |
| 5,837,475 A | 11/1998 | Dorsal et al. ................ 435/7.1 |
| 5,841,555 A | 11/1998 | Bianco et al. .................. 359/2 |
| 5,846,737 A | 12/1998 | Kang ......................... 435/7.1 |
| 5,874,187 A | 2/1999 | Colvin et al. .................. 430/2 |
| 5,895,750 A | 4/1999 | Mushahwar et al. ........ 435/7.5 |
| 5,922,550 A | 7/1999 | Everhart et al. ........... 435/7.21 |
| 5,925,562 A | 7/1999 | Nova et al. ............... 435/287.1 |
| 5,925,878 A | 7/1999 | Challener ................... 250/225 |
| 5,945,679 A | 8/1999 | Dorsal et al. ............. 250/458.1 |
| 5,981,166 A | 11/1999 | Mandecki ...................... 435/4 |
| 5,986,838 A | 11/1999 | Thomas, III ................. 360/60 |
| 5,989,923 A | 11/1999 | Lowe et al. ................. 436/518 |
| 5,998,796 A | 12/1999 | Liu et al. .................. 250/458.1 |
| 6,001,510 A | 12/1999 | Meng et al. ................... 430/1 |
| 6,005,691 A * | 12/1999 | Grot et al. ...................... 359/2 |
| 6,017,754 A | 1/2000 | Chestnut et al. .......... 435/320.1 |
| 6,025,129 A | 2/2000 | Nova et al. ..................... 435/6 |
| 6,025,283 A | 2/2000 | Roberts ........................ 442/15 |
| 6,035,082 A | 3/2000 | Murphy et al. ............... 385/37 |
| 6,036,807 A | 3/2000 | Brongers ..................... 156/233 |
| 6,043,880 A | 3/2000 | Andrews et al. ............ 356/311 |
| 6,046,925 A | 4/2000 | Tsien et al. ................. 365/111 |
| 6,049,727 A | 4/2000 | Crothall ...................... 600/310 |
| 6,057,107 A | 5/2000 | Fulton ........................... 435/6 |
| 6,060,256 A | 5/2000 | Everhart et al. ........... 435/7.21 |
| 6,067,167 A | 5/2000 | Atkinson et al. ............ 356/437 |
| 6,067,392 A | 5/2000 | Wakami et al. ............... 385/37 |
| 6,078,048 A | 6/2000 | Stevens et al. ......... 250/339.02 |
| 6,087,186 A | 7/2000 | Cargill et al. ............... 436/518 |
| 6,096,496 A | 8/2000 | Frankel ......................... 435/4 |
| 6,097,485 A | 8/2000 | Lievan ........................ 356/338 |
| 6,103,535 A | 8/2000 | Pilevar et al. ............... 436/518 |
| 6,118,127 A | 9/2000 | Liu et al. .................. 250/458.1 |
| 6,160,240 A | 12/2000 | Momma et al. ......... 219/121.85 |
| 6,160,656 A | 12/2000 | Mossberg et al. ........... 359/328 |
| 6,164,548 A | 12/2000 | Curiel ......................... 235/487 |
| 6,165,592 A | 12/2000 | Berger et al. ............. 428/195.1 |
| 6,165,648 A | 12/2000 | Colvin et al. .................. 430/1 |
| 6,174,648 B1 | 1/2001 | Terao et al. ................. 430/321 |
| 6,194,563 B1 | 2/2001 | Cruickshank ............... 536/25.3 |
| 6,214,560 B1 * | 4/2001 | Yguerabide et al. ......... 435/7.1 |
| 6,218,194 B1 | 4/2001 | Lyndin et al. ............... 436/518 |
| 6,221,579 B1 | 4/2001 | Everhart et al. ............... 435/5 |
| 6,229,635 B1 | 5/2001 | Wulf .......................... 359/196 |
| 6,259,450 B1 | 7/2001 | Chiabrera et al. ........... 345/419 |
| 6,268,128 B1 | 7/2001 | Collins et al. .................. 435/6 |
| 6,284,459 B1 | 9/2001 | Nova et al. ..................... 435/6 |
| 6,292,282 B1 | 9/2001 | Mossberg et al. ............. 398/99 |
| 6,292,319 B1 | 9/2001 | Thomas, III ................. 360/60 |
| 6,301,047 B1 | 10/2001 | Hoshino et al. ............. 359/566 |
| 6,304,263 B1 | 10/2001 | Chiabrera et al. ........... 345/419 |
| 6,306,587 B1 | 10/2001 | Royer et al. .................... 435/6 |
| 6,309,601 B1 | 10/2001 | Juncosa et al. ............. 422/68.1 |
| 6,312,961 B1 | 11/2001 | Seul ............................ 436/518 |
| 6,313,771 B1 | 11/2001 | Munroe et al. .............. 341/137 |
| 6,314,220 B1 | 11/2001 | Mossberg et al. ............. 385/37 |
| 6,319,668 B1 | 11/2001 | Nova et al. ..................... 435/6 |
| 6,322,932 B1 | 11/2001 | Colvin et al. .................. 430/2 |
| RE37,473 E | 12/2001 | Challener ................... 250/225 |
| 6,329,963 B1 | 12/2001 | Chiabrera et al. ............. 345/6 |
| 6,331,273 B1 | 12/2001 | Nova et al. ................. 422/68.1 |
| 6,340,588 B1 | 1/2002 | Nova et al. ............... 435/287.1 |

| | | | | | | |
|---|---|---|---|---|---|---|
| 6,352,854 B1 | 3/2002 | Nova et al. ............... 435/287.1 | | 6,689,316 B1 | 2/2004 | Blyth et al. ................... 422/56 |
| 6,355,198 B1 | 3/2002 | Kim et al. .................. 264/259 | | 6,692,031 B2 | 2/2004 | McGrew ...................... 283/93 |
| 6,371,370 B2 | 4/2002 | Sadler ........................ 235/454 | | 6,692,912 B1 | 2/2004 | Boles et al. ................... 435/6 |
| 6,372,428 B1 | 4/2002 | Nova et al. ..................... 435/6 | | 2002/0022273 A1 | 2/2002 | Empedocles et al. |
| 6,399,295 B1 | 6/2002 | Kaylor et al. .................. 435/5 | | 2002/0090650 A1 | 7/2002 | Empedocles et al. |
| 6,406,841 B1 | 6/2002 | Lee et al. ....................... 435/5 | | 2003/0032203 A1 | 2/2003 | Sabatini et al. |
| 6,406,848 B1 | 6/2002 | Bridgham et al. ............. 435/6 | | 2003/0129654 A1 | 7/2003 | Ravkin et al. |
| 6,416,714 B1 | 7/2002 | Nova et al. ................ 422/68.1 | | 2003/0138208 A1 | 7/2003 | Pawlak et al. |
| 6,417,010 B1 | 7/2002 | Cargill et al. ............... 436/518 | | 2006/0057729 A1* | 3/2006 | Moon et al. ................... 436/57 |
| 6,428,707 B1 | 8/2002 | Berg et al. .................. 210/661 | | | | |
| 6,428,957 B1 | 8/2002 | Delenstarr ..................... 435/6 | | | FOREIGN PATENT DOCUMENTS | |
| 6,433,849 B1 | 8/2002 | Lowe ......................... 349/123 | | GB | 2372100 | 8/2002 |
| 6,436,651 B1 | 8/2002 | Everhart et al. ............ 435/7.21 | | WO | WO 9636436 A1 * | 11/1996 |
| RE37,891 E | 10/2002 | Collins et al. .................. 435/6 | | WO | 0158583 | 8/2001 |
| 6,489,606 B1 | 12/2002 | Kersey et al. ......... 250/227.14 | | WO | 03061983 | 7/2003 |
| 6,496,287 B1 | 12/2002 | Seiberle et al. ............... 359/15 | | | | |
| 6,506,342 B1 | 1/2003 | Frankel ........................ 422/63 | | | | |
| 6,515,753 B2 | 2/2003 | Maher et al. ................ 356/614 | | | | |
| 6,522,406 B1 | 2/2003 | Rovira et al. ................ 356/369 | | | | |
| 6,524,793 B1 | 2/2003 | Chandler et al. ............... 435/6 | | | | |
| 6,533,183 B2 | 3/2003 | Aasmul et al. .............. 235/494 | | | | |
| 6,542,673 B1 | 4/2003 | Holter et al. ................. 385/52 | | | | |
| 6,560,017 B1 | 5/2003 | Bianco ........................ 359/566 | | | | |
| 6,565,770 B1 | 5/2003 | Mayer et al. .......... 252/301.36 | | | | |
| 6,592,036 B2 | 7/2003 | Sadler ......................... 235/454 | | | | |
| 6,594,421 B1 | 7/2003 | Johnson et al. ............... 385/37 | | | | |
| 6,609,728 B1 | 8/2003 | Voerman et al. .............. 283/70 | | | | |
| 6,613,581 B1 | 9/2003 | Wada et al. ................. 436/518 | | | | |
| 6,618,342 B1 | 9/2003 | Johnson et al. ............. 369/100 | | | | |
| 6,622,916 B1 | 9/2003 | Bianco ........................ 235/454 | | | | |
| 6,628,439 B2 | 9/2003 | Shiozawa et al. .............. 359/2 | | | | |
| 6,632,655 B1 | 10/2003 | Mehta et al. ............. 435/288.5 | | | | |
| 6,635,470 B1 | 10/2003 | Vann ....................... 435/287.2 | | | | |
| 6,678,429 B2 | 1/2004 | Mossberg et al. ............. 385/10 | | | | |

OTHER PUBLICATIONS

Peter A. Krug, Measurement of index modulation along an optical fiber Bragg grating, vol. 20, No. 17, Sep. 1, 2005.

Pierre-Yves Fonjallas, et al, Interferometric side diffraction technique for the characterisation of fibre gratings, 1999 OSA Conf., Sep. 23-25, 1999.

E.N. Leith et al., Holographic Data Storage in Three-Dimensional Applied Optics, vol. 5, No. 8, pp. 1303-1311, Aug. 1966.

A. Vander Lugt, Design Relationships for Holographic Memories Applied Optics, vol. 12, No. 7, pp. 1675-1685, Jul. 1973.

Herwig Kogelnik, Coupled Wave Theory for Thick Hologram Gratings Bell Sys. Tech. Journal, vol. 48, No. 9, pp. 2909-2947, Nov. 1969.

Othonos, A. , et al., "Superimposed Multiple Bragg Gratings", *Electronics Letters*, 30, (Nov. 10, 1994), 1972-1974.

* cited by examiner

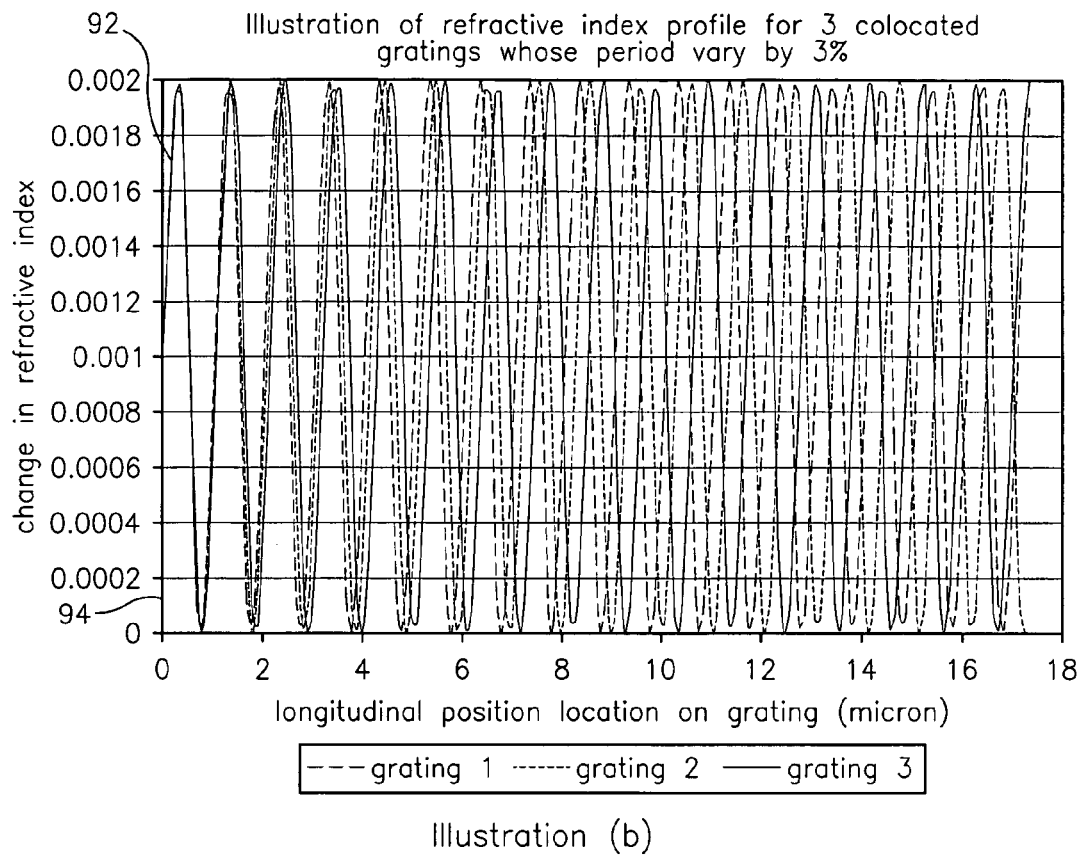
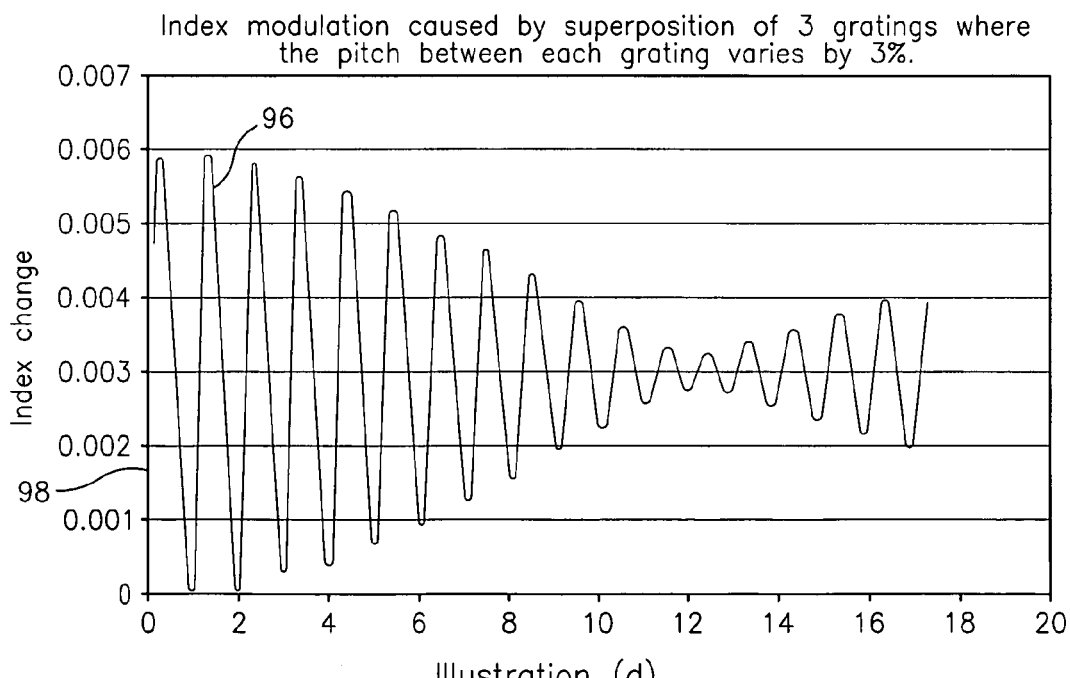
FIG. 9

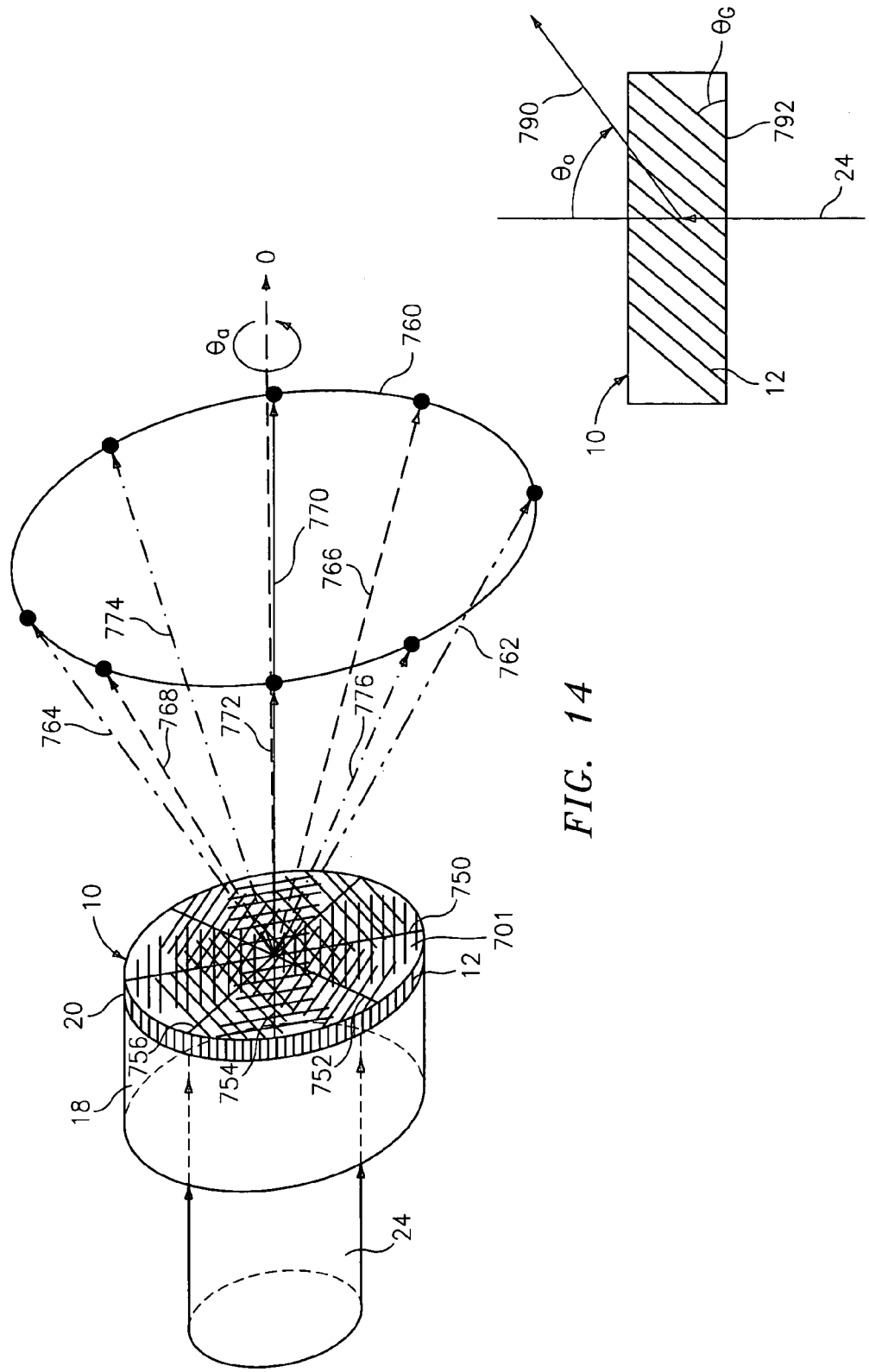

Illustration(a)     Illustration(b)     Illustration(c)

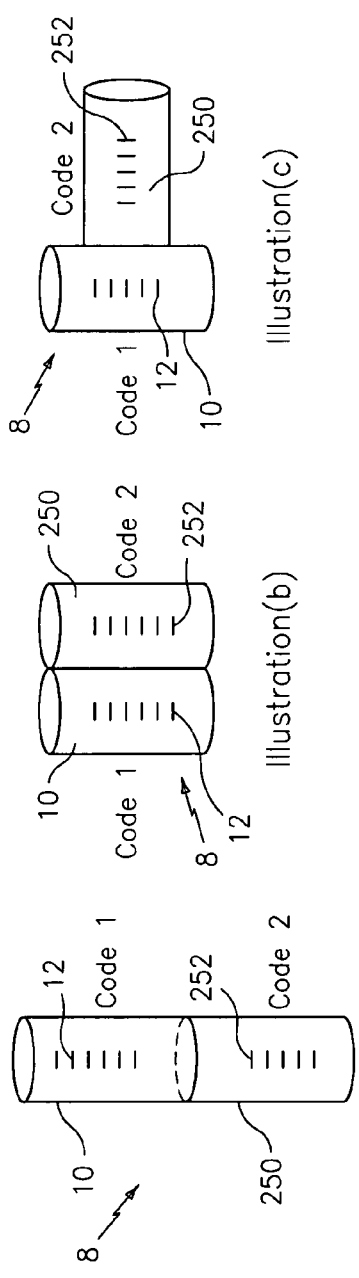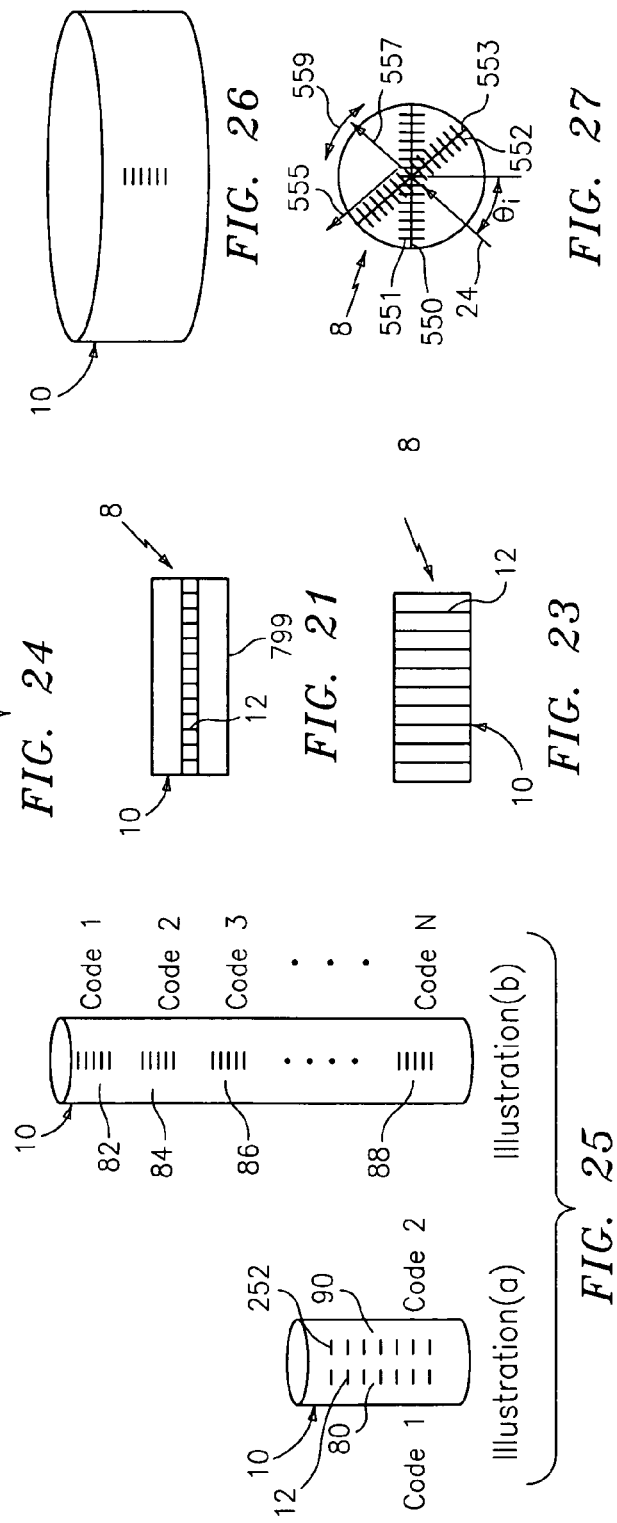

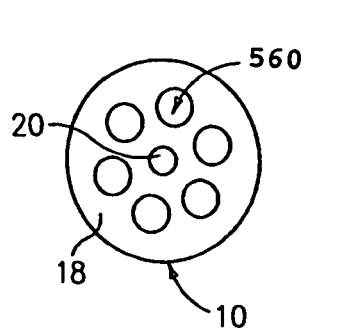 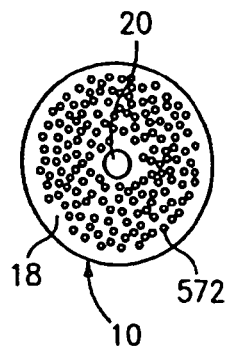 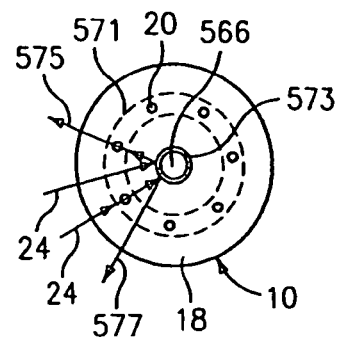
Illustration(a)　　　Illustration(b)　　　Illustration(c)
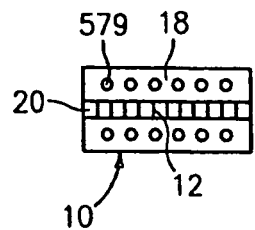 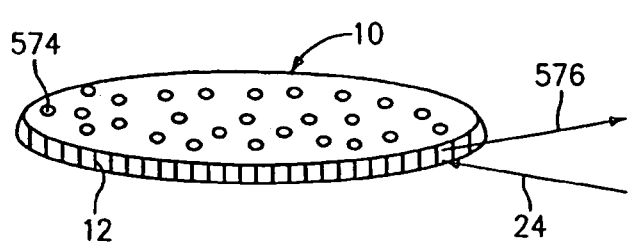
Illustration(d)　　　　　　Illustration(e)
FIG. 28
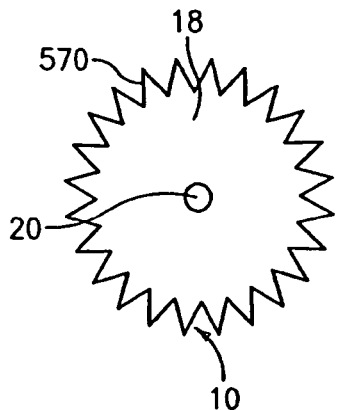 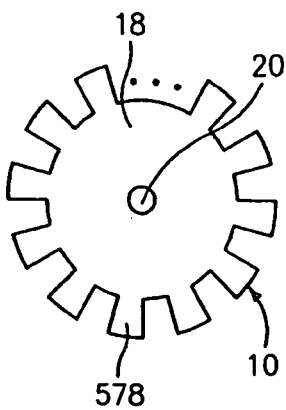 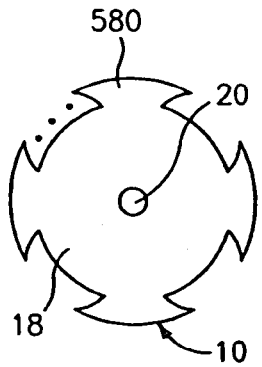
Illustration(a)　　　Illustration(b)　　　Illustration(c)
FIG. 29
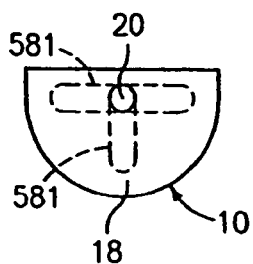 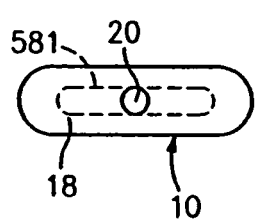 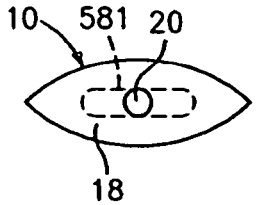
Illustration(a)　　　Illustration(b)　　　Illustration(c)
FIG. 30

CHEMICAL SYNTHESIS USING DIFFRACTION GRATING-BASED ENCODED OPTICAL ELEMENTS

CROSS REFERENCES TO RELATED APPLICATIONS

This application claims the benefit of U.S. Provisional Patent Applications, Ser. No. 60/410,541, filed Sep. 12, 2002, and is a continuation-in-part of U.S. patent application, Ser. No. 10/645,689, filed Aug. 20, 2003, and is a continuation-in-part of U.S. patent application, Ser. No. 10/645,686, filed Aug. 20, 2003, each of which are incorporated herein by reference in their entirety.

U.S. patent application Ser. No. 10/661,234, and application Ser. No. 10/661,082, filed contemporaneously herewith, contains subject matter related to that disclosed herein, which is incorporated by reference in its entirety.

TECHNICAL FIELD

This invention relates to chemical synthesis, and more particularly to chemical synthesis that use optically encoded beads, micro-particles, or elements.

BACKGROUND ART

A common form of chemical synthesis in combinatorial chemistry is known as "solid phase" chemical synthesis. This synthesis technique uses encoded beads or particles as a solid support for the synthesis of chemicals and/or chemical libraries Existing technologies, such as bar codes, electronic microchips/transponders, radio-frequency identification (RFID), and fluorescence and other optical techniques, are often inadequate. For example, existing technologies may be too large for certain applications, may not provide enough different codes (i.e., limited multiplexing capability), or cannot withstand harsh temperature, chemical, nuclear and/or electromagnetic environments, or may otherwise be not well suited for certain types of chemical synthesis or true combinatorial chemistry.

Therefore, it would be desirable to obtain a coding element or platform that provides the capability of providing many codes (e.g., greater than 1 million codes), that can be made very small, that can withstand harsh environments, and/or can enable "true" combinatorial chemistry.

SUMMARY OF THE INVENTION

Objects of the present invention include provision of an optical identification element or platform that allows for a large number of distinct codes, can be made very small, and/or can withstand harsh environments.

According to the present invention an optical identification element having a synthesized chemical attached thereto comprises: an optical substrate; at least a portion of said substrate being made of a substantially single material and having at least one diffraction grating embedded therein, said grating having a resultant refractive variation within the substantially single material at a grating location; said grating providing an output optical signal indicative of a code when illuminated by an incident light signal propagating from outside the substrate, said output optical signal being a result of passive, non-resonant scattering from said grating when illuminated by said incident light signal; and the synthesized chemical being attached to at least a portion of said substrate.

The present invention provides an encoded optical element platform for performing large numbers of combinatorial chemistry tasks/experiments.

Also, the elements may be very small "microbeads" (or microelements or microparticles or encoded particles) for synthesis that requires small substrates (about 1–1000 microns), or larger "macroelements" for synthesis that allows for larger substrates or beads (e.g., 1–1000 mm or much larger). The elements may also be referred to as encoded particles or encoded threads. Also, the element may be embedded within or part of a larger substrate or object. A common synthesis use will be as microbeads. Also, chemicals can be synthesized on microbeads located in a glass column reaction vessel.

The beads may be chemically coated before or after synthesis, to either enhance chemical synthesis or help preserve it after synthesis is complete.

The invention may be used with any known combinatorial chemistry or biochemistry synthesis process, and are especially adaptable to synthesis processes having solid phase immobilization. The invention may be used in many areas such as drug discovery, biology, proteomics, combinatorial chemistry, assays or multiplexed experiments. Any type of chemical, or molecule chain that can be synthesized on a glass or other solid support bead may be synthesized using the present invention as the solid support. For example, genes, DNA, cDNA, RNA, proteins, particles, biological particles, cells, molecules, atoms, nucleotides, oligomers, peptides, antigen, antibodies, ligands, receptors, hydrocarbons, polymers, radioactive or non-radioactive particles.

The elements also allow for quality control of the synthesized chemical to be easily tested, providing a higher level of quality chemicals.

The foregoing and other objects, features and advantages of the present invention will become more apparent in light of the following detailed description of exemplary embodiments thereof.

BRIEF DESCRIPTION OF THE DRAWINGS

FIG. 14 is a perspective view showing azimuthal multiplexing of a thin grating for an optical identification element, in accordance with the present invention.

FIG. 15 is side view of a blazed grating for an optical identification element, in accordance with the present invention.

FIG. 21 is a side view of an optical identification element having a coating, in accordance with the present invention.

FIG. 23 is a side view of an optical identification element having a grating across an entire dimension, in accordance with the present invention.

FIG. 24, illustrations (a)–(c), are perspective views of alternative embodiments for an optical identification element, in accordance with the present invention.

FIG. 25, illustrations (a)–(b), are perspective views of an optical identification element having multiple grating locations, in accordance with the present invention.

FIG. 26, is a perspective view of an alternative embodiment for an optical identification element, in accordance with the present invention.

FIG. 27 is a view an optical identification element having a plurality of gratings located rotationally around the optical identification element, in accordance with the present invention.

FIG. 28 illustrations (a)–(e) show various geometries of an optical identification element that may have holes therein, in accordance with the present invention.

FIG. 29 illustrations (a)–(c) show various geometries of an optical identification element that may have teeth thereon, in accordance with the present invention.

FIG. 30 illustrations (a)–(c) show various geometries of an optical identification element, in accordance with the present invention.

BEST MODE FOR CARRYING OUT THE INVENTION

Figure 1:
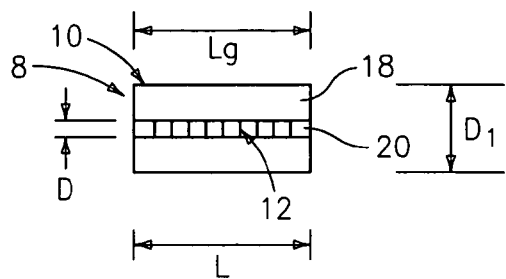
FIG. 1 is a side view of an optical identification element, in accordance with the present invention.

Referring to FIG. 1, a diffraction grating-based optical identification element 8 (or encoded element or coded element) comprises a known optical substrate 10, having an optical diffraction grating 12 disposed (or written, impressed, embedded, imprinted, etched, grown, deposited or otherwise formed) in the volume of or on a surface of a substrate 10. The grating 12 is a periodic or aperiodic variation in the effective refractive index and/or effective optical absorption of at least a portion of the substrate 10.

The optical identification element 8 described herein is the same as that described in Copending Patent Application Ser. No. 10/645,689, and in Copending Patent Application Ser. No. 10/645,686, both filed contemporaneously herewith, which are both incorporated herein by reference in their entirety.

In particular, the substrate 10 has an inner region 20 where the grating 12 is located. The inner region 20 may be photosensitive to allow the writing or impressing of the grating 12. The substrate 10 has an outer region 18, which does not have the grating 12 therein.

The grating 12 is a combination of one or more individual spatial periodic sinusoidal variations (or components) in the refractive index that are collocated at substantially the same location on the substrate 10 along the length of the grating region 20, each having a spatial period (or pitch) $\Lambda$. The resultant combination of these individual pitches is the grating 12, comprising spatial periods ($\Lambda 1$–$\Lambda n$) each representing a bit in the code. Thus, the grating 12 represents a unique optically readable code, made up of bits, where a bit corresponds to a unique pitch $\Lambda$ within the grating 12. Accordingly, for a digital binary (0–1) code, the code is determined by which spatial periods ($\Lambda 1$–$\Lambda n$) exist (or do not exist) in a given composite grating 12. The code or bits may also be determined by additional parameters (or additional degrees of multiplexing), and other numerical bases for the code may be used, as discussed herein and/or in the aforementioned patent application.

The grating 12 may also be referred to herein as a composite or collocated grating. Also, the grating 12 may be referred to as a "hologram", as the grating 12 transforms, translates, or filters an input optical signal to a predetermined desired optical output pattern or signal.

The substrate 10 has an outer diameter D1 and comprises silica glass ($SiO_2$) having the appropriate chemical composition to allow the grating 12 to be disposed therein or thereon. Other materials for the optical substrate 10 may be used if desired. For example, the substrate 10 may be made of any glass, e.g., silica, phosphate glass, borosilicate glass, or other glasses, or made of glass and plastic, or solely plastic. For high temperature or harsh chemical applications, the optical substrate 10 made of a glass material is desirable. If a flexible substrate is needed, plastic, rubber or polymer-based substrate may be used. The optical substrate 10 may be any material capable of having the grating 12 disposed in the grating region 20 and that allows light to pass through it to allow the code to be optically read.

The optical substrate 10 with the grating 12 has a length L and an outer diameter D1, and the inner region 20 diameter D. The length L can range from very small "microbeads" (or microelements, micro-particles, or encoded particles), about 1–1000 microns or smaller, to larger "macrobeads" or "macroelements" for larger applications (about 1.0–1000 mm or greater). In addition, the outer dimension D1 can range from small (less than 1000 microns) to large (1.0–1000 mm and greater). Other dimensions and lengths for the substrate 10 and the grating 12 may be used.

The grating 12 may have a length Lg of about the length L of the substrate 10. Alternatively, the length Lg of the grating 12 may be shorter than the total length L of the substrate 10.

The outer region 18 is made of pure silica ($SiO_2$) and has a refractive index n2 of about 1.458 (at a wavelength of about 1553 nm), and the inner grating region 20 of the substrate 10 has dopants, such as germanium and/or boron, to provide a refractive index n1 of about 1.453, which is less than that of outer region 18 by about 0.005. Other indices of refraction n1,n2 for the grating region 20 and the outer region 18, respectively, may be used, if desired, provided the grating 12 can be impressed in the desired grating region 20. For example. the grating region 20 may have an index ofrefraction that is larger than that of the outer region 18 or grating region 20 may have the same index of refraction as the outer region 18 if desired.

Figure 2:
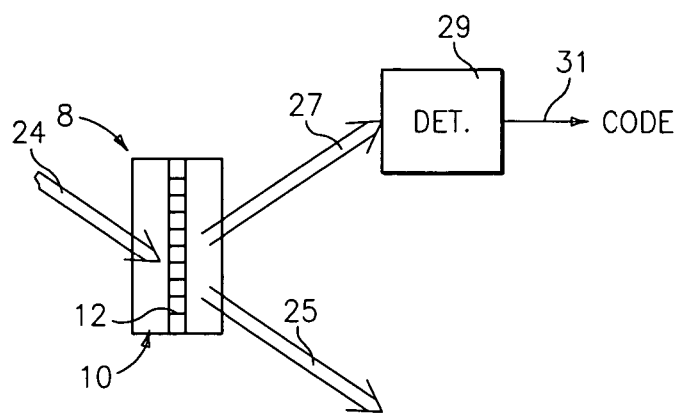
FIG. 2 is a top level optical schematic for reading a code in an optical identification element, in accordance with the present invention.

Referring to FIG. 2, an incident light 24 of a wavelength $\lambda$, e.g., 532 nm from a known frequency doubled Nd:YAG laser or 632 nm from a known Helium-Neon laser, is incident on the grating 12 in the substrate 10. Any other input wavelength $\lambda$ can be used if desired provided $\lambda$ is within the optical transmission range of the substrate (discussed more herein and/or in the aforementioned patent application). A portion of the input light 24 passes straight through the grating 12, as indicated by a line 25. The remainder of the input light 24 is reflected by the grating 12, as indicated by a line 27 and provided to a detector 29. The output light 27 may be a plurality of beams, each having the same wavelength $\lambda$ as the input wavelength $\lambda$ and each having a different output angle indicative of the pitches ($\Lambda 1-\Lambda n$) existing in the grating 12.

Alternatively, the input light 24 may be a plurality of wavelengths and the output light 27 may have a plurality of wavelengths indicative of the pitches ($\Lambda 1-\Lambda n$) existing in the grating 12. Alternatively, the output light may be a combination of wavelengths and output angles. The above techniques are discussed in more detail herein and/or in the aforementioned patent application.

The detector 29 has the necessary optics, electronics, software and/or firmware to perform the functions described herein. In particular, the detector reads the optical signal 27 diffracted or reflected from the grating 12 and determines the code based on the pitches present or the optical pattern, as discussed more herein or in the aforementioned patent application. An output signal indicative of the code is provided on a line 31.

Figure 3:
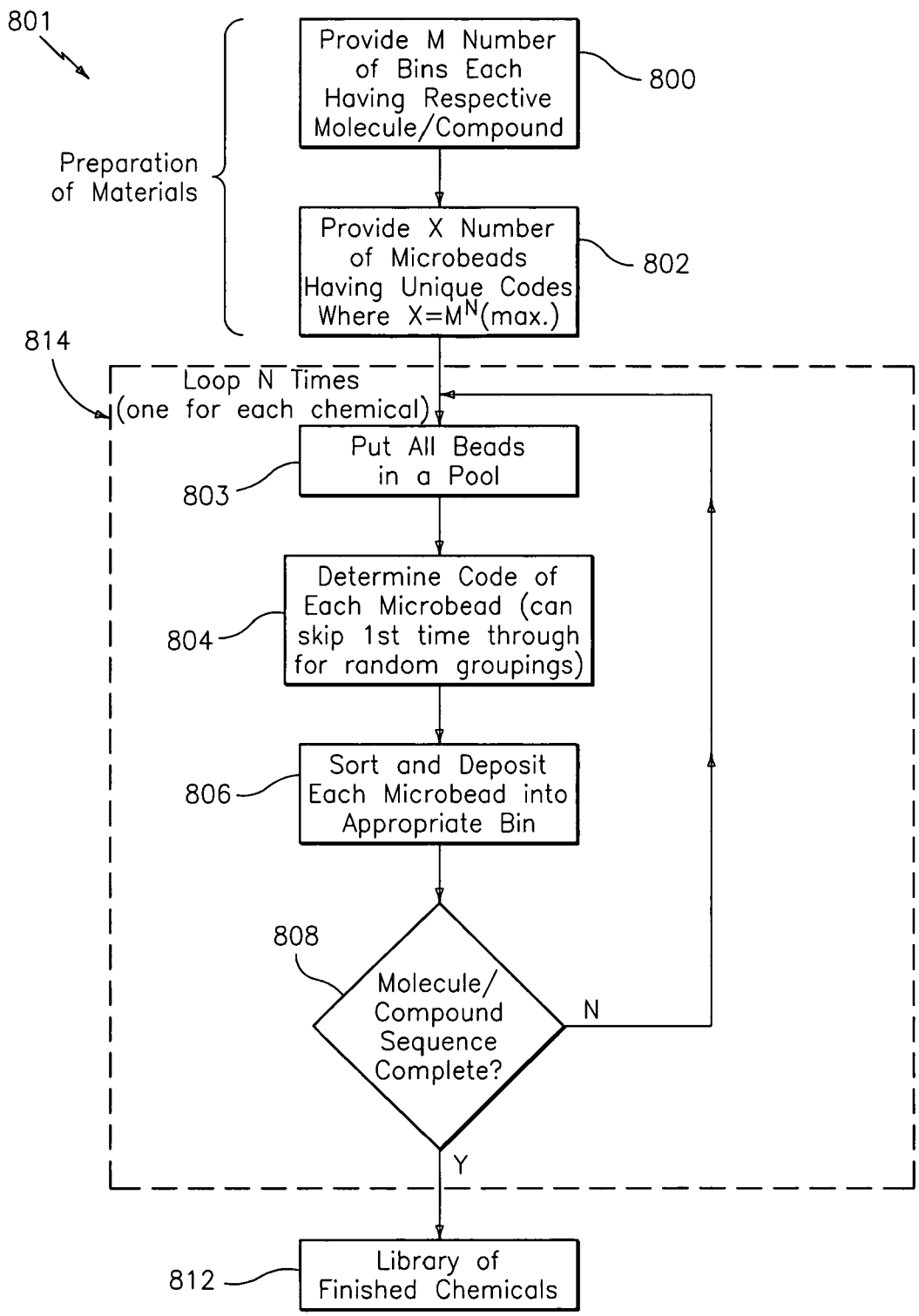
FIG. 3 is a flow chart for a chemical split and pool chemical synthesis process, in accordance with the present invention.

Referring to FIG. 3, the optical elements described herein may be used to synthesize chemicals in a known split and pool synthesis technique. In particular, a known split and pool bead based synthesis process 801, may be performed starting with a step 800 where a predetermined number M of compounds or chemicals are provided each in a separate bin or container and at step 802 where a predetermined number X of microbeads 8 are provided each having it own unique code. Steps 800, 802 are material preparation steps and can be done in either order. After the materials are prepared, a step 803 combines or pools all the beads together. Then, a step 804 determines the code for each microbead 8. This step can be skipped on the first time through the process if it is desired to randomly split up the beads into groups, i.e., to not split the groups up by code on bead during the first run. Next a step 806 sorts the beads based on its code and deposits the bead into the appropriate bin for the chemical to be added to the bead.

Next, a step 808 tests to see if the chemical synthesis is complete for each bead. If not the process goes back to step 803 where the remaining beads are recombined or re-pooled and the process starts again. The loop 814 repeats a predetermined number of times N, where each time through the loop 814 another chemical is added to each of the beads. If certain beads are to have fewer chemicals than others, then certain beads will drop out of the process before others. When the step 808 concludes that one or more beads have completed their synthesis process, a step 812 logs the completion of that bead and the remainder of the beads continue until all desired chemicals have synthesized on the beads.

For example, for M=4 compounds and N=10 chemicals to add to each bead, the total number of different codes needed would be 1,048,576 or $M^N$ and if there will be only one bead with each desired chemical (i.e., no redundancy), then the number of beads X would also be $M^N$=1,048,576.

Figure 4:
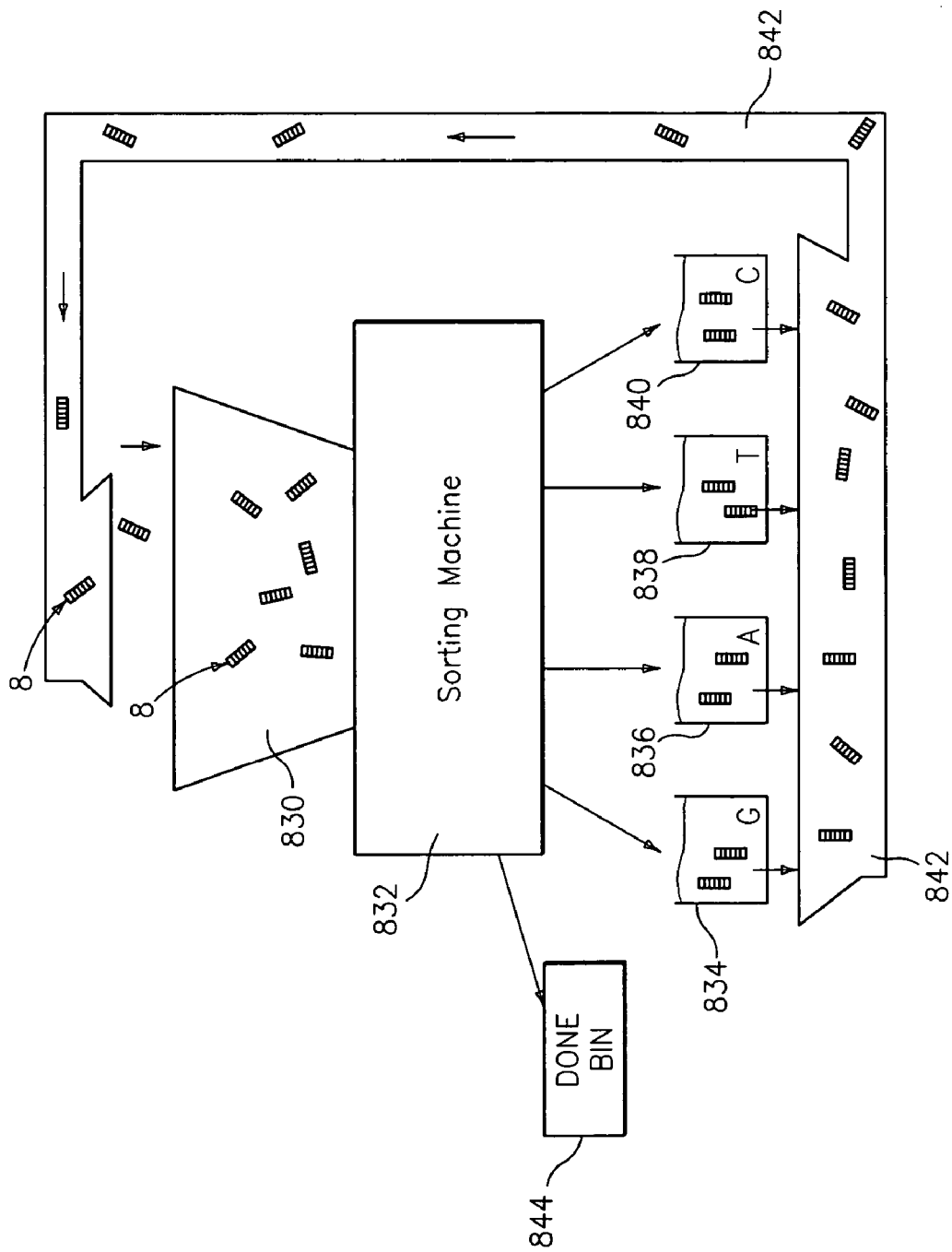
FIG. 4 is a diagram of a chemical split and pool synthesis apparatus, in accordance with the present invention.

Referring to FIG. 4, an automated synthesis machine is shown for synthesizing a chemical having four different possible compounds or cells or molecules (e.g., GCAT for a DNA synthesis), where a main bin 830 receives or pools all the beads 8 and provides the beads 8 to a sorting machine 832, which performs the sorting step 806 in the loop 814. In addition the machine 832 deposits the beads in the proper bins 834,836, 838,840, having the bases G,C,A,T, respectively. Any other four chemicals can be used if desired. Once the specific base has been attached to a bead it is dropped or placed in a device 842 which transports the beads back into the main bin 830 for resorting by the machine 832. When synthesis has been completed on a given bead the machine deposits the completed bead in a done bin 844.

If it is desired to produce multiple of the same chemical on separate beads this can be done by having multiple beads with the same code, or presetting certain groups of codes to have the same chemical composition. In that case, each of these beads may go to the same bins in the same order as a group.

The present invention may be used with any known combinatorial chemistry, chemical synthesis process, or synthesizing labeled combinatorial chemistry libraries, and are especially adaptable to solid phase synthesis, for example: U.S. Pat. No. 6,417,010, "Methods and Apparatus for Synthesizing Labeled Combinatorial Chemistry Labraries", U.S. Pat. No. 6,558,904 entitled "Method for producing structured, self-organized molecular monolayers of individual molecular species, in particular substance libraries"; U.S. Pat. No. 6,541,276 entitled "Methods for solid-phase synthesis of hydroxylamine compounds and derivatives and combinatorial libraries thereof"; U.S. Pat. No. 6,541,211 "Apparatus and method for synthesizing combinational libraries"; U.S. Pat. No. 6,528,324 entitled "Apparatus for pre-determined mass sorting of positional-encoded solid phase synthesis supports"; U.S. Pat. No. 6,506,558 entitled "Very large scale immobilized polymer synthesis"; U.S. Pat. No. 6,495,539 entitled "B-lactam-like chaperone inhibitors"; U.S. Pat. No. 6,468,740 entitled "Cyclic and substituted immobilized molecular synthesis"; U.S. Pat. No. 6,417,010 entitled "Methods and apparatus for synthesizing labeled combinatorial chemistry libraries; U.S. Pat. No. 6,410,643 entitled "Solid phase synthesis method and reagent"; U.S. Pat. No. 6,410,342 entitled "Method and apparatus for controlled photoelution"; U.S. Pat. No. 6,387, 636 entitled "Method of shielding biosynthesis reactions from the ambient environment on an array"; U.S. Pat. No. 6,372,885 entitled "Solid-phase technology for the preparation of amides"; U.S. Pat. No. 6,368,874 entitled "Methods for hard-tagging an encoded synthetic library"; U.S. Pat. No. 6,362,009 entitled "Solid phase synthesis of heterocycles"; U.S. Pat. No. 6,346,423 entitled "Methods and compositions for producing biopolymeric arrays"; U.S. Pat. No. 6,329,210 entitled "Method and apparatus for high volume polymer synthesis"; U.S. Pat. No. 6,294,694 entitled "Matrix metalloproteinase inhibitors and method of using same"; U.S. Pat. No. 6,274,385 entitled "Attached tags for use in combinatorial chemistry synthesis"; U.S. Pat. No. 6,265,228 entitled "Process for preparing combinatorial amide alcohol libraries"; U.S. Pat. No. 6,251,595 entitled "Methods and devices for carrying out chemical reactions"; U.S. Pat. No. 6,127,190 entitled "Method for producing combinatorial libraries having a predetermined frequency of each species of test compound"; U.S. Pat. No. 5,929,208 entitled "Methods for electronic synthesis of polymers"; U.S. Pat. No. 5,886,186 entitled "Synthesis of substituted N-heteroaromatic compounds and methods of use thereof"; U.S. Pat. No. 5,885,837 entitled "Very large scale immobilized polymer synthesis using mechanically directed flow paths"; U.S. Pat. No. 5,859,191 entitled "Method for the site-specific modification of peptide alpha amines"; U.S. Pat. No. 5,763,263 entitled "Method and apparatus for producing position addressable combinatorial libraries"; U.S. Pat. No. 5,712,171 entitled "Method of generating a plurality of chemical compounds in a spatially arranged array"; U.S. Pat. No. 5,690,894 entitled "High density array fabrication and readout method for a fiber optic biosensor"; U.S. Pat. No. 5,545,568 entitled "Solid phase and combinatorial synthesis of compounds on a solid support"; U.S. Pat. No. 5,545,531 entitled "Methods for making a device for concurrently processing multiple biological chip assays"; U.S. Pat. No. 5,539,083 entitled "Peptide nucleic acid combinatorial libraries and improved methods of synthesis"; U.S. Pat. No. 5,384,261 entitled "Very large scale immobilized polymer synthesis using mechanically directed flow paths"; U.S. Pat. No. 5,288,514 entitled "Solid phase and combinatorial synthesis of benzodiazepine compounds on a solid support"; U.S. Pat. No. 5,264,563 entitled "Process for synthesizing oligonucleotides with random codons"; U.S. Pat. No. 5,010,175 entitled "General method for producing and selecting peptides with specific properties"; U.S. Pat. No. 6,465,192 entitled "Compounds and methods for the inhibition of protein-protein interactions"; U.S. Pat. No. 6,440,669 entitled "Methods for applying small volumes of reagents"; U.S. Pat. No. 6,406,844 entitled "Very large scale immobilized polymer synthesis"; U.S. Pat. No. 6,329,010 entitled "Method and apparatus for high volume polymer synthesis"; U.S. Pat. No. 6,316,623 entitled "Ethylenediamine compound libraries"; U.S. Pat. No. 5,780,241 entitled "Complex chemical libraries"; U.S. Pat. No. 5,712,171 entitled "Method of generating a plurality of chemical compounds in a spatially arranged array"; U.S. Pat. No. 5,593,853 entitled "Generation and screening of synthetic drug libraries"; U.S. Pat. No. 6,569,631 entitled "Microplate thermal shift assay for ligand development using 5-(4"dimethylaminophenyl)-2-(4'-phenyl)oxazole derivative fluorescent dyes"; U.S. Pat. No. 6,503,759 entitled "Complex combinatorial chemical libraries encoded with tags"; U.S. Pat. No. 6,492,125 entitled "Method to assess library X library interactions"; U.S. Pat. No. 6,457,807 entitled "Mass-based encoding and qualitative analysis of combinatorial libraries"; U.S. Pat. No. 6,455,263 entitled "Small molecule library screening using FACS"; U.S. Pat. No. 6,096,496 entitled "Supports incorporating vertical cavity emitting lasers and tracking apparatus for use in combinatorial synthesis"; U.S. Pat. No. 5,770,455 entitled "Methods and apparatus for synthesizing labeled combinatorial chemistrylibraries"; U.S. Pat. No. 5,751,629 entitled "Remotely programmable matrices with memories"; U.S. Pat. No. 6,537,504 "Method and apparatus for concurrent and sequential multi-step reactions for producing a plurality of different chemical compounds"; U.S. Pat. No. 6,468,806 "Potential masking systems and methods for combinatorial library synthesis"; U.S. Pat. No. 6,429,027 "Composite arrays utilizing microspheres"; U.S. Pat. No. 6,420,169 "Apparatus for forming polynucleotides or polypeptides"; U.S. Pat. No. 6,448,443 "Synthesis of combinatorial libraries of compounds reminiscent of natural products"; U.S. Pat. No. 5,840,485 "Topologically segregated, encoded solid phase libraries".

Figure 5:
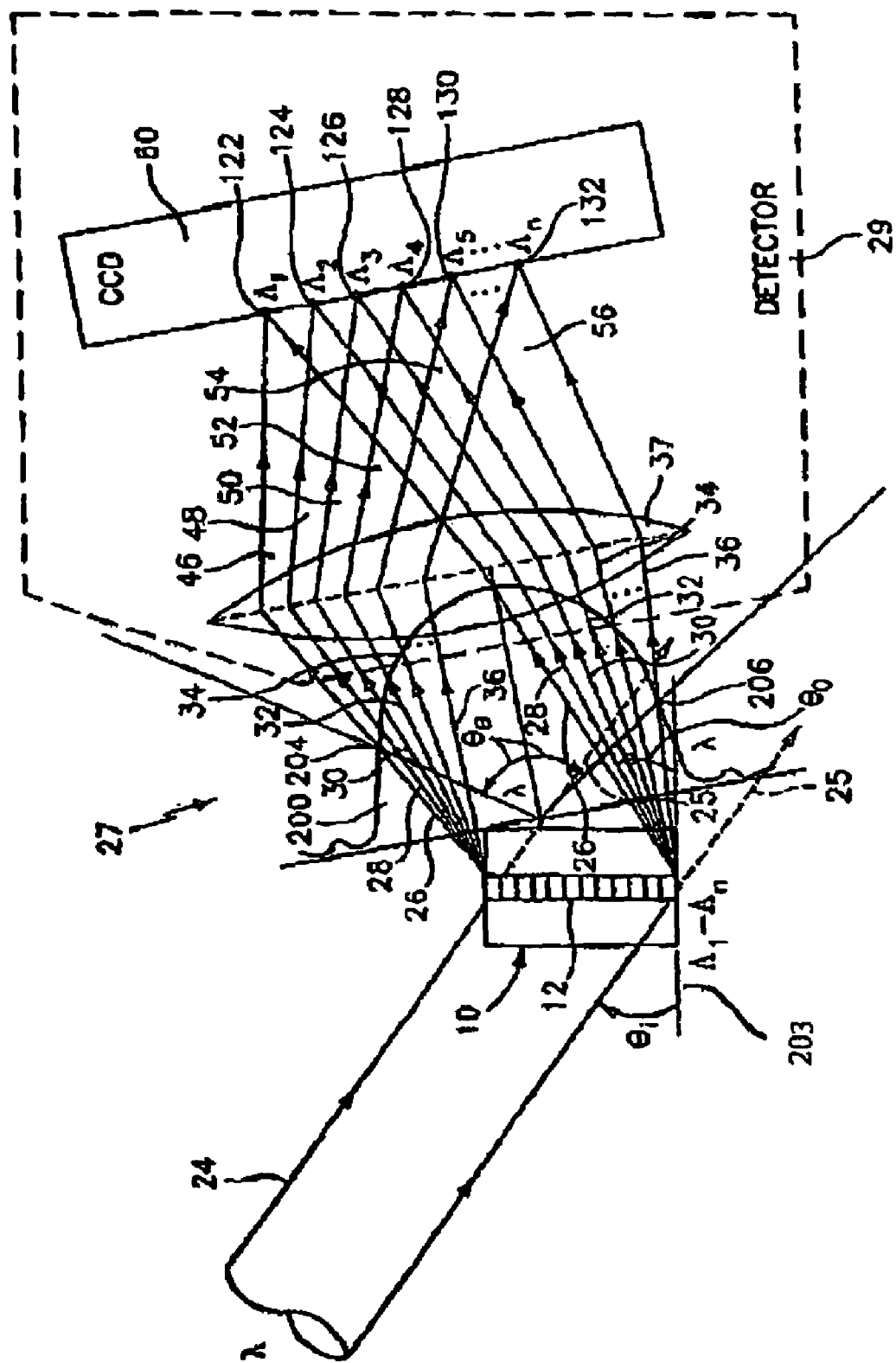
FIG. 5 is an optical schematic for reading a code in an optical identification element, in accordance with the present invention.

Referring to FIG. 5, The reflected light 27, comprises a plurality of beams 26–36 that pass through a lens 37, which provides focused light beams 46–56, respectively, which are imaged onto a CCD camera 60. The lens 37 and the camera 60, and any other necessary electronics or optics for performing the functions described herein, make up the reader 29. Instead of or in addition to the lens 37, other imaging optics may be used to provide the desired characteristics of the optical image/signal onto the camera 60 (e.g., spots, lines, circles, ovals, etc.), depending on the shape of the substrate 10 and input optical signals. Also, instead of a CCD camera other devices may be used to read/capture the output light.

Figure 6:
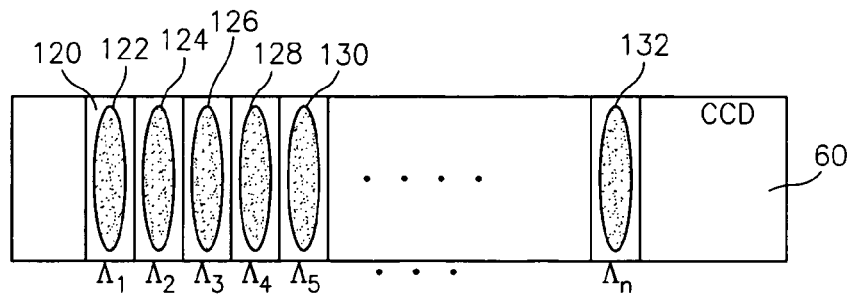
FIG. 6 is an image of a code on a CCD camera from an optical identification element, in accordance with the present invention.
Figure 7:
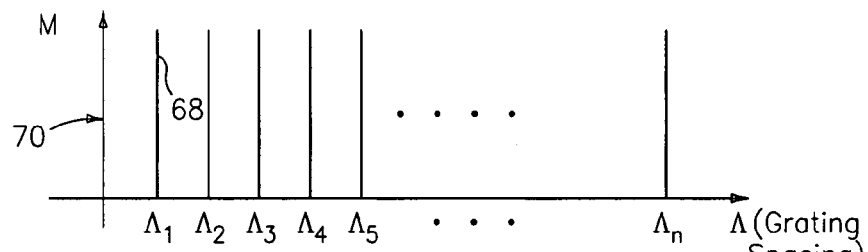
FIG. 7 is a graph showing a digital representation of bits in a code in an optical identification element, in accordance with the present invention.

Referring to FIG. 6, the image on the CCD camera 60 is a series of illuminated stripes indicating ones and zeros of a digital pattern or code of the grating 12 in the element 8. Referring to FIG. 7, lines 68 on a graph 70 are indicative of a digitized version of the image of FIG. 6 as indicated in spatial periods ($\Lambda 1 - \Lambda n$).

Each of the individual spatial periods ($\Lambda 1 - \Lambda n$) in the grating 12 is slightly different, thus producing an array of N unique diffraction conditions (or diffraction angles) discussed more hereinafter. When the element 8 is illuminated from the side, in the region of the grating 12, at an appropriate input angle, e.g., about 30 degrees, with a single input wavelength $\lambda$ (monochromatic) source, the diffracted (or reflected) beams 26–36 are generated. Other input angles $\theta i$ may be used if desired, depending on various design parameters as discussed herein and/or in the aforementioned patent application, and provided that a known diffraction equation (Eq. 1 below) is satisfied:

$$\sin(\theta_i) + \sin(\theta_o) = m\lambda/n\Lambda \qquad \text{Eq. 1}$$

where Eq. 1 is diffraction (or reflection or scatter) relationship between input wavelength $\lambda$, input incident angle $\theta i$, output incident angle $\theta o$, and the spatial period $\Lambda$ of the grating 12. Further, m is the "order" of the reflection being observed, and n is the refractive index of the substrate 10. The value of m=1 or first order reflection is acceptable for illustrative purposes. Eq. 1 applies to light incident on outer surfaces of the substrate 10 which are parallel to the longitudinal axis of the grating (or the $k_B$ vector). Because the angles $\theta i, \theta o$ are defined outside the substrate 10 and because the effective refractive index of the substrate 10 is substantially a common value, the value of n in Eq. 1 cancels out of this equation.

Thus, for a given input wavelength $\lambda$, grating spacing $\Lambda$, and incident angle of the input light $\theta i$, the angle $\theta o$ of the reflected output light may be determined. Solving Eq. 1 for $\theta o$ and plugging in m=1, gives:

$$\theta o = \sin^{-1}(\lambda/\Lambda - \sin(\theta i)) \qquad \text{Eq. 2}$$

For example, for an input wavelength $\lambda$=532 nm, a grating spacing $\Lambda$=0.532 microns (or 532 nm), and an input angle of incidence $\theta i$=30 degrees, the output angle of reflection will be $\theta o$=30 degrees. Alternatively, for an input wavelength $\lambda$=632 nm, a grating spacing $\Lambda$=0.532 microns (or 532 nm), and an input angle $\theta i$ of 30 degrees, the output angle of reflection $\theta o$ will be at 43.47 degrees, or for an input angle θi=37 degrees, the output angle of reflection will be θo=37 degrees. Any input angle that satisfies the design requirements discussed herein and/or in the aforementioned patent application may be used.

In addition, to have sufficient optical output power and signal to noise ratio, the output light 27 should fall within an acceptable portion of the Bragg envelope (or normalized reflection efficiency envelope) curve 200, as indicated by points 204,206, also defined as a Bragg envelope angle θB, as also discussed herein and/or in the aforementioned patent application. The curve 200 may be defined as:

$$I(ki, ko) \approx [KD]^2 \operatorname{sinc}^2\left[\frac{(ki-ko)D}{2}\right] \quad \text{Eq. 3}$$

where $K=2\pi\delta n/\lambda$, where, $\delta n$ is the local refractive index modulation amplitude of the grating and $\lambda$ is the input wavelength, $\operatorname{sinc}(x)=\sin(x)/x$, and the vectors $k_i=2\pi \cos(\theta_i)/\lambda$ and $k_o=2\pi \cos(\theta_o)/\lambda$ are the projections of the incident light and the output (or reflected) light, respectively, onto the line 203 normal to the axial direction of the grating 12 (or the grating vector $k_B$), D is the thickness or depth of the grating 12 as measured along the line 203 (normal to the axial direction of the grating 12). Other substrate shapes than a cylinder may be used and will exhibit a similar peaked characteristic of the Bragg envelope. We have found that a value for $\delta n$ of about $10^{-4}$ in the grating region of the substrate is acceptable; however, other values may be used if desired.

Rewriting Eq. 3 gives the reflection efficiency profile of the Bragg envelope as:

$$I(ki, ko) \approx \left[\frac{2\pi \cdot \delta n \cdot D}{\lambda}\right]^2 \left[\frac{\sin(x)}{x}\right]^2 \quad \text{Eq. 4}$$

where:

$$x=(ki-ko)D/2=(\pi D/\lambda)*(\cos\theta i - \cos\theta o)$$

Thus, when the input angle θi is equal to the output (or reflected) angle $\theta_o$ (i.e., $\theta i=\theta_o$), the reflection efficiency I (Eqs. 3 & 4) is maximized, which is at the center or peak of the Bragg envelope. When $\theta i=\theta_o$, the input light angle is referred to as the Bragg angle as is known. The efficiency decreases for other input and output angles (i.e., $\theta i \neq \theta_o$), as defined by Eqs. 3 & 4. Thus, for maximum reflection efficiency and thus output light power, for a given grating pitch Λ and input wavelength, the angle θi of the input light 24 should be set so that the angle θo of the reflected output light equals the input angle θi.

Also, as the thickness or diameter D of the grating decreases, the width of the sin(x)/x function (and thus the width of the Bragg envelope) increases and, the coefficient to or amplitude of the sinc² (or (sin(x)/x)² function (and thus the efficiency level across the Bragg envelope) also increases, and vice versa. Further, as the wavelength λ increases, the half-width of the Bragg envelope as well as the efficiency level across the Bragg envelope both decrease. Thus, there is a trade-off between the brightness of an individual bit and the number of bits available under the Bragg envelope. Ideally, δn should be made as large as possible to maximize the brightness, which allows D to be made smaller.

From Eq. 3 and 4, the half-angle of the Bragg envelope $\theta_B$ is defined as:

$$\theta_B = \frac{\eta\lambda}{\pi D \sin(\theta_i)} \quad \text{Eq. 5}$$

where η is a reflection efficiency factor which is the value for x in the $\operatorname{sinc}^2(x)$ function where the value of $\operatorname{sinc}^2(x)$ has decreased to a predetermined value from the maximum amplitude as indicated by points 204,206 on the curve 200.

We have found that the reflection efficiency is acceptable when $\eta \leq 1.39$. This value for η corresponds to when the amplitude of the reflected beam (i.e., from the $\operatorname{sinc}^2(x)$ function of Eqs. 3 & 4) has decayed to about 50% of its peak value. In particular, when x=1.39=η, $\operatorname{sinc}^2(x)=0.5$. However, other values for efficiency thresholds or factor in the Bragg envelope may be used if desired.

The beams 26–36 are imaged onto the CCD camera 60 to produce the pattern of light and dark regions 120–132 representing a digital (or binary) code, where light=1 and dark=0 (or vice versa). The digital code may be generated by selectively creating individual index variations (or individual gratings) with the desired spatial periods Λ1–Λn. Other illumination, readout techniques, types of gratings, geometries, materials, etc. may be used as discussed in the aforementioned patent application.

Figure 8:
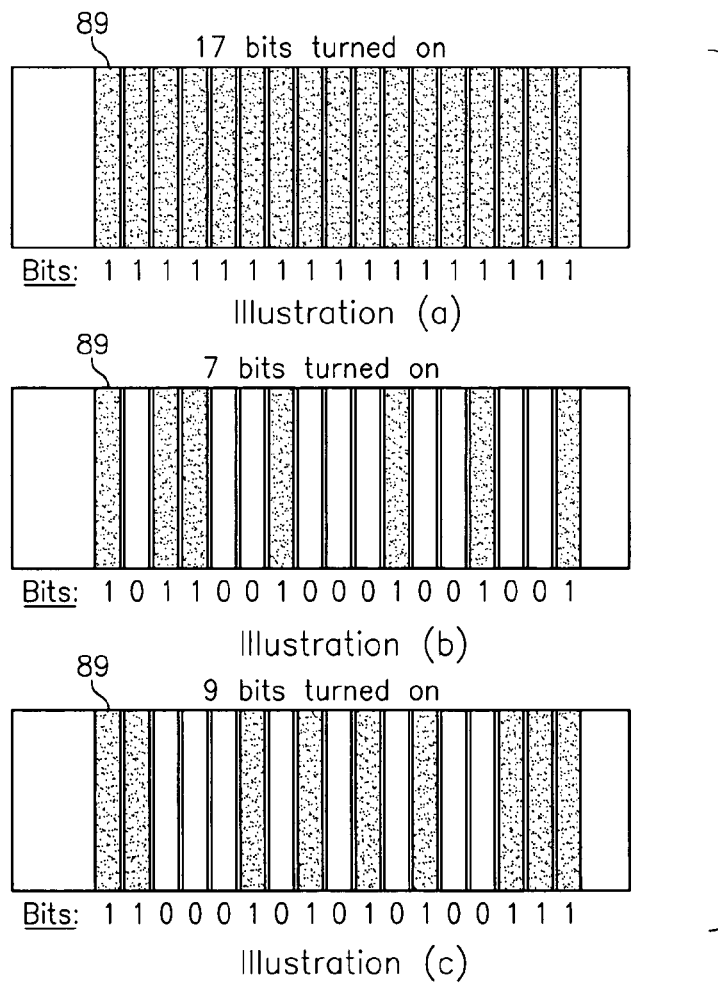
FIG. 8 illustrations (a)–(c) show images of digital codes on a CCD camera, in accordance with the present invention.

Referring to FIG. 8, illustrations (a)–(c), for the grating 12 in a cylindrical substrate 10 having a sample spectral 17 bit code (i.e., 17 different pitches Λ1–Λ17), the corresponding image on the CCD (Charge Coupled Device) camera 60 is shown for a digital pattern 17 bit locations 89, including FIG. 8. illustrations (b), (c) and (d), respectively, of 7 bits turned on (10110010001001001); 9 bits turned on of (11000101010100111); and all 17 bits turned on of (11111111111111111).

For the images in FIG. 8, the length of the substrate 10 was 450 microns, the outer diameter D1 was 65 microns, the inner diameter D was 14 microns, δn for the grating 12 was about $10^{-4}$, n1 in portion 20 was about 1.458 (at a wavelength of about 1550 nm), n2 in portion 18 was about 1.453, the average pitch spacing Λ for the grating 12 was about 0.542 microns, and the spacing between pitches ΔΛ was about 0.36% of the adjacent pitches Λ.

Figure 9:
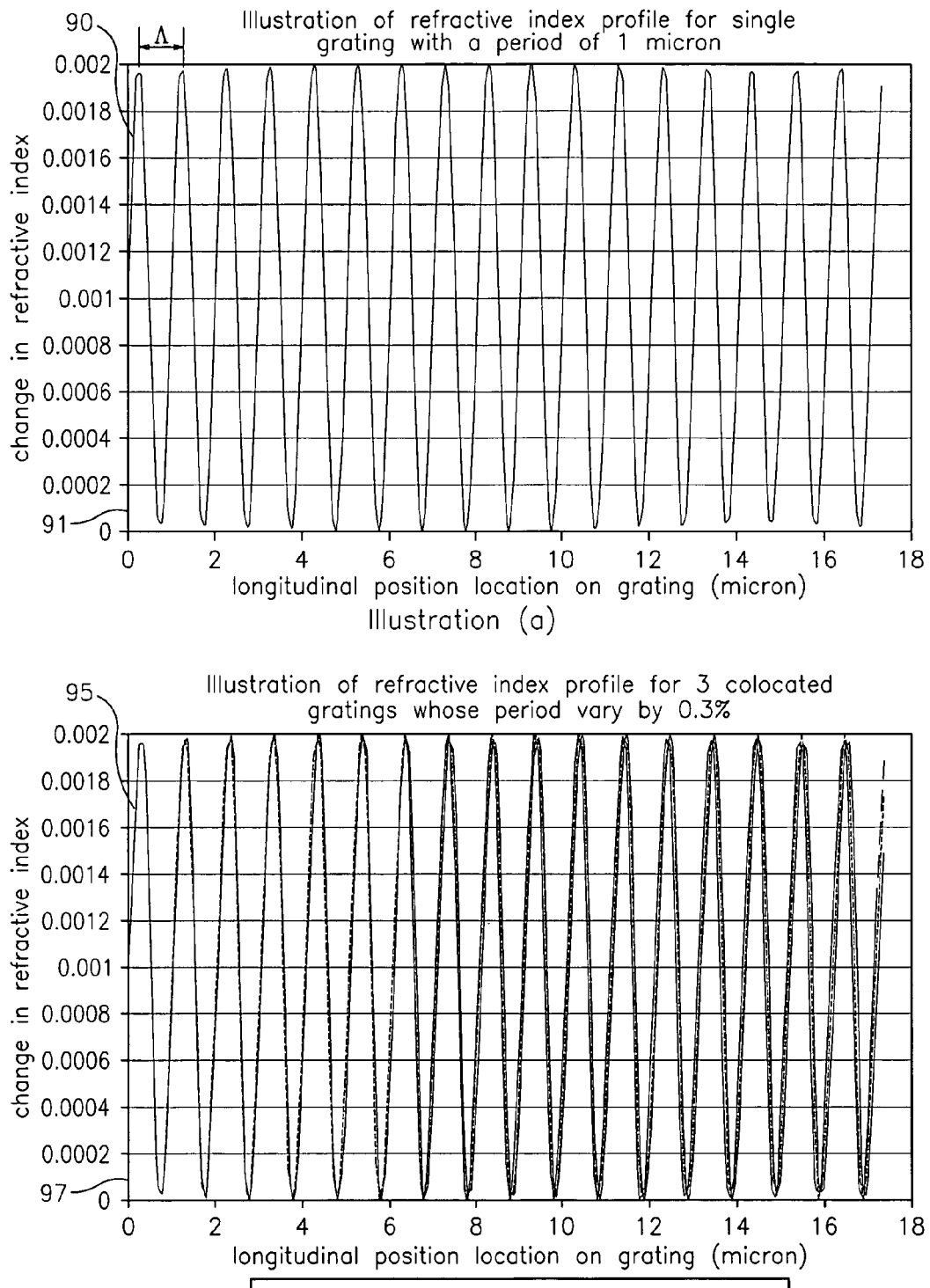
FIG. 9 illustrations (a)–(d) show graphs of different refractive index pitches and a summation graph, in accordance with the present invention.

Referring to FIG. 9, illustration (a), the pitch Λ of an individual grating is the axial spatial period of the sinusoidal variation in the refractive index n1 in the region 20 of the substrate 10 along the axial length of the grating 12 as indicated by a curve 90 on a graph 91. Referring to FIG. 9, illustration (b), a sample composite grating 12 comprises three individual gratings that are co-located on the substrate 10, each individual grating having slightly different pitches, Λ1, Λ2, Λ3, respectively, and the difference (or spacing) ΔΛ between each pitch Λ being about 3.0% of the period of an adjacent pitch Λ as indicated by a series of curves 92 on a graph 94. Referring to FIG. 9, illustration (c), three individual gratings, each having slightly different pitches, Λ1, Λ2, Λ3, respectively, are shown, the difference ΔΛ between each pitch Λ being about 0.3% of the pitch Λ of the adjacent pitch as shown by a series of curves 95 on a graph 97. The individual gratings in FIG. 9, illustrations (b) and (c) are shown to all start at 0 for illustration purposes; however, it should be understood that, the separate gratings need not all start in phase with each other. Referring to FIG. 9, illustration (d), the overlapping of the individual sinusoidal refractive index variation pitches Λ1–Λn in the grating region 20 of the substrate 10, produces a combined resultant refractive index variation in the composite grating 12 shown as a curve 96 on a graph 98 representing the combination of the three pitches shown in FIG. 9, illustration (b). Accordingly, the resultant refractive index variation in the grating region 20 of the substrate 10 may not be sinusoidal and is a combination of the individual pitches Λ (or index variation).

The maximum number of resolvable bits N, which is equal to the number of different grating pitches Λ (and hence the number of codes), that can be accurately read (or resolved) using side-illumination and side-reading of the grating 12 in the substrate 10, is determined by numerous factors, including: the beam width w incident on the substrate (and the corresponding substrate length L and grating length Lg), the thickness or diameter D of the grating 12, the wavelength λ of incident light, the beam divergence angle $\theta_R$, and the width of the Bragg envelope $\theta_B$ (discussed more in the aforementioned patent application), and may be determined by the equation:

$$N \cong \frac{\eta \beta L}{2D \sin(\theta_i)} \qquad \text{Eq. 6}$$

Figure 10:
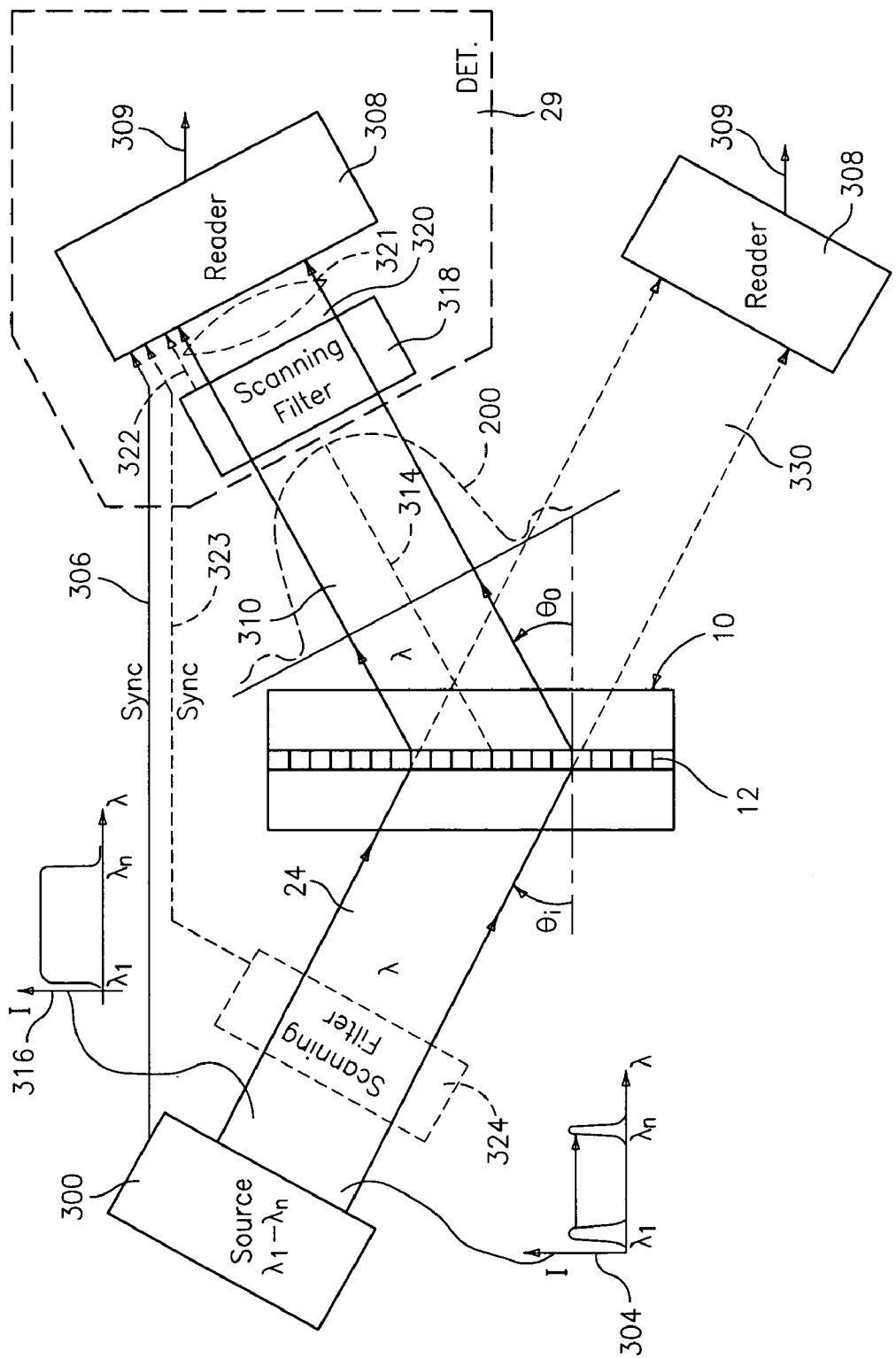
FIG. 10 is an alternative optical schematic for reading a code in an optical identification element, in accordance with the present invention.

Referring to FIG. 10, instead of having the input light 24 at a single wavelength λ (monochromatic) and reading the bits by the angle θo of the output light, the bits (or grating pitches Λ) may be read/detected by providing a plurality of wavelengths and reading the wavelength spectrum of the reflected output light signal. In this case, there would be one bit per wavelength, and thus, the code is contained in the wavelength information of the reflected output signal.

In this case, each bit (or Λ) is defined by whether its corresponding wavelength falls within the Bragg envelope, not by its angular position within the Bragg envelope 200. As a result, it is not limited by the number of angles that can fit in the Bragg envelope 200 for a given composite grating 12, as in the embodiment discussed hereinbefore. Thus, using multiple wavelengths, the only limitation in the number of bits N is the maximum number of grating pitches Λ that can be superimposed and optically distinguished in wavelength space for the output beam.

Figure 11:
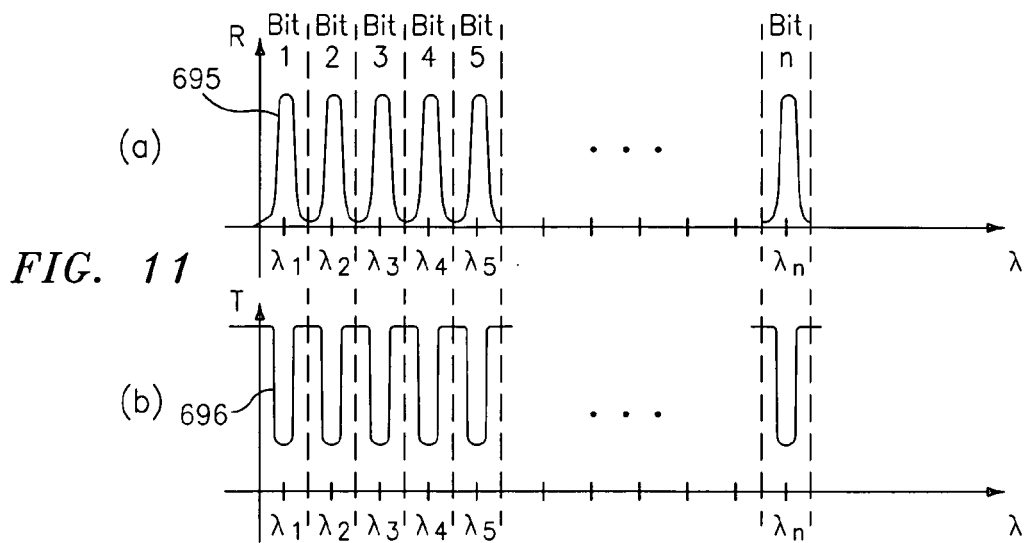
FIG. 11 illustrations (a)–(b) are graphs of reflection and transmission wavelength spectrum for an optical identification element, in accordance with the present invention.

Referring to FIGS. 10 and 11, illustration (a), the reflection wavelength spectrum (λ1–λn) of the reflected output beam 310 will exhibit a series of reflection peaks 695, each appearing at the same output Bragg angle θo. Each wavelength peak 695 (λ1–λn) corresponds to an associated spatial period (Λ1–Λn), which make up the grating 12.

One way to measure the bits in wavelength space is to have the input light angle θi equal to the output light angle θo, which is kept at a constant value, and to provide an input wavelength λ that satisfies the diffraction condition (Eq. 1) for each grating pitch Λ. This will maximize the optical power of the output signal for each pitch Λ detected in the grating 12.

Referring to 11, illustration (b), the transmission wavelength spectrum of the transmitted output beam 330 (which is transmitted straight through the grating 12) will exhibit a series of notches (or dark spots) 696. Alternatively, instead of detecting the reflected output light 310, the transmitted light 330 may be detected at the detector/reader 308. It should be understood that the optical signal levels for the reflection peaks 695 and transmission notches 696 will depend on the "strength" of the grating 12, i.e., the magnitude of the index variation n in the grating 12.

In FIG. 10, the bits may be detected by continuously scanning the input wavelength. A known optical source 300 provides the input light signal 24 of a coherent scanned wavelength input light shown as a graph 304. The source 300 provides a sync signal on a line 306 to a known reader 308. The sync signal may be a timed pulse or a voltage ramped signal, which is indicative of the wavelength being provided as the input light 24 to the substrate 10 at any given time. The reader 308 may be a photodiode, CCD camera, or other optical detection device that detects when an optical signal is present and provides an output signal on a line 309 indicative of the code in the substrate 10 or of the wavelengths present in the output light, which is directly related to the code, as discussed herein. The grating 12 reflects the input light 24 and provides an output light signal 310 to the reader 308. The wavelength of the input signal is set such that the reflected output light 310 through an optical lens 321 will be substantially in the center 314 of the Bragg envelope 200 for the individual grating pitch (or bit) being read.

Alternatively, the source 300 may provide a continuous broadband wavelength input signal such as that shown as a graph 316. In that case, the reflected output beam 310 signal is provided to a narrow band scanning filter 318 which scans across the desired range of wavelengths and provides a filtered output optical signal 320 to the reader 308. The filter 318 provides a sync signal on a line 322 to the reader, which is indicative of which wavelengths are being provided on the output signal 320 to the reader and may be similar to the sync signal discussed hereinbefore on the line 306 from the source 300. In this case, the source 300 does not need to provide a sync signal because the input optical signal 24 is continuous. Alternatively, instead of having the scanning filter being located in the path of the output beam 310, the scanning filter may be located in the path of the input beam 24 as indicated by the dashed box 324, which provides the sync signal on a line 323.

Alternatively, instead of the scanning filters 318,324, the reader 308 may be a known optical spectrometer (such as a known spectrum analyzer), capable of measuring the wavelength of the output light.

The desired values for the input wavelengths λ (or wavelength range) for the input signal 24 from the source 300 may be determined from the Bragg condition of Eq. 1, for a given grating spacing Λ and equal angles for the input light θi and the angle light θo. Solving Eq. 1 for λ and plugging in m=1, gives:

$$\lambda = \Lambda[\sin(\theta o) + \sin(\theta i)] \qquad \text{Eq. 7}$$

It is also possible to combine the angular-based code detection with the wavelength-based code detection, both discussed hereinbefore. In this case, each readout wavelength is associated with a predetermined number of bits within the Bragg envelope. Bits (or grating pitches Λ) written for different wavelengths do not show up unless the correct wavelength is used.

Accordingly, the bits (or grating pitches Λ) can be read using one wavelength and many angles, many wavelengths and one angle, or many wavelengths and many angles.

Figure 12:
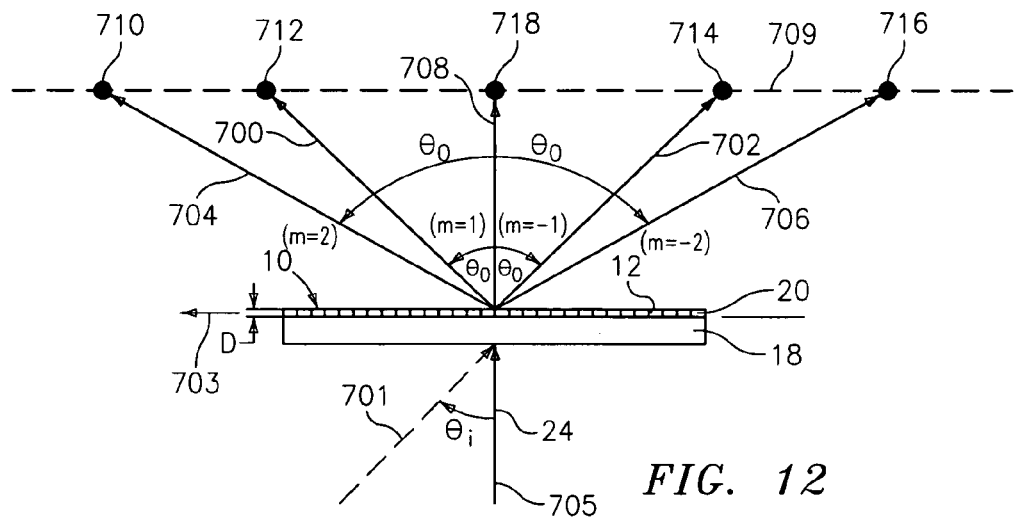
FIGS. 12–13 are side views of a thin grating for an optical identification element, in accordance with the present invention.

Referring to FIG. 12, the grating 12 may have a thickness or depth D which is comparable or smaller than the incident beam wavelength λ. This is known as a "thin" diffraction grating (or the full angle Bragg envelope is 180 degrees). In that case, the half-angle Bragg envelope θB is substantially 90 degrees; however, δn must be made large enough to provide sufficient reflection efficiency, per Eqs. 3 and 4. In particular, for a "thin" grating, $D*\delta n \approx \lambda/2$, which corresponds to a π phase shift between adjacent minimum and maximum refractive index values of the grating 12.

It should be understood that there is still a trade-off discussed hereinbefore with beam divergence angle $\theta_R$ and the incident beam width (or length L of the substrate), but the accessible angular space is theoretically now 90 degrees. Also, for maximum efficiency, the phase shift between adjacent minimum and maximum refractive index values of the grating 12 should approach a π phase shift; however, other phase shifts may be used.

In this case, rather than having the input light 24 coming in at the conventional Bragg input angle θi, as discussed hereinbefore and indicated by a dashed line 701, the grating 12 is illuminated with the input light 24 oriented on a line 705 orthogonal to the longitudinal grating vector 703. The input beam 24 will split into two (or more) beams of equal amplitude, where the exit angle $\theta_o$ can be determined from Eq. 1 with the input angle $\theta_i=0$ (normal to the longitudinal axis of the grating 12).

In particular, from Eq. 1, for a given grating pitch Λ1, the +/−$1^{st}$ order beams (m=+1 and m=−1), corresponds to output beams 700,702, respectively. For the +/−$2^{nd}$ order beams (m=+2 and m=−2), corresponds to output beams 704,706, respectively. The $0^{th}$ order (undefracted) beam (m=0), corresponds to beam 708 and passes straight through the substrate. The output beams 700–708 project spectral spots or peaks 710–718, respectively, along a common plane, shown from the side by a line 709, which is parallel to the upper surface of the substrate 10.

For example, for a grating pitch Λ=1.0 um, and an input wavelength λ=400 nm, the exit angles $\theta_o$ are ~+/−23.6 degrees (for m=+/−1), and +/−53.1 degrees (from m=+/−2), from Eq. 1. It should be understood that for certain wavelengths, certain orders (e.g., m=+/−2) may be reflected back toward the input side or otherwise not detectable at the output side of the grating 12.

Alternatively, one can use only the +/−$1^{st}$ order (m=+/−1) output beams for the code, in which case there would be only 2 peaks to detect, 712, 714. Alternatively, one can also use any one or more pairs from any order output beam that is capable of being detected. Alternatively, instead of using a pair of output peaks for a given order, an individual peak may be used.

Figure 13:
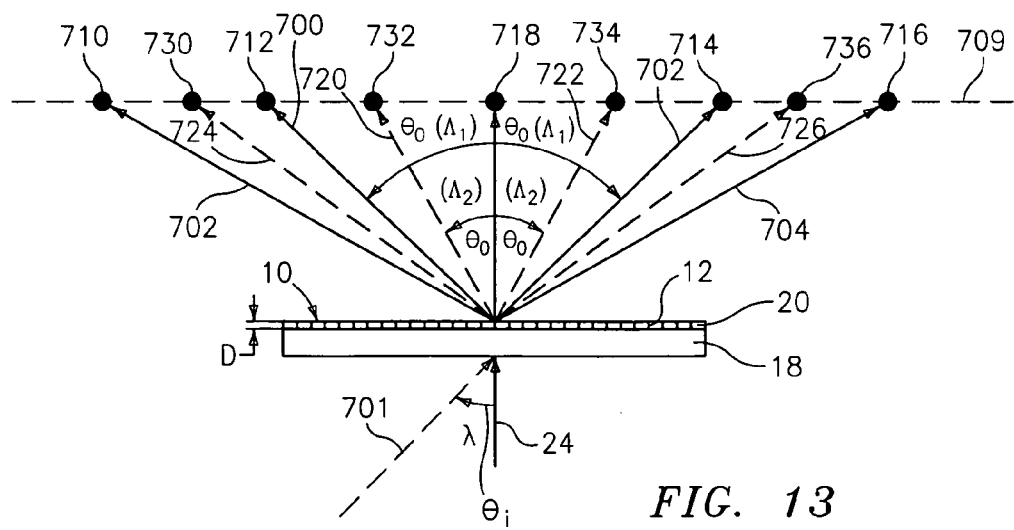

Referring to FIG. 13, if two pitches Λ1,Λ2 exist in the grating 12, two sets of peaks will exist. In particular, for a second grating pitch Λ2, the +/−$1^{st}$ order beams (m=+1 and m=−1), corresponds to output beams 720,722, respectively. For the +/−$2^{nd}$ order beams (m=+2 and m=−2), corresponds to output beams 724,726, respectively. The $0^{th}$ order (undefracted) beam (m=0), corresponds to beam 718 and passes straight through the substrate. The output beams 720–726 corresponding to the second pitch Λ2 project spectral spots or peaks 730–736, respectively, which are at a different location than the point 710–716, but along the same common plane, shown from the side by the line 709.

Thus, for a given pitch Λ (or bit) in a grating, a set of spectral peaks will appear at a specific location in space. Thus, each different pitch corresponds to a different elevation or output angle which corresponds to a predetermined set of spectral peaks. Accordingly, the presence or absence of a particular peak or set of spectral peaks defines the code.

In general, if the angle of the grating 12 is not properly aligned with respect to the mechanical longitudinal axis of the substrate 10, the readout angles may no longer be symmetric, leading to possible difficulties in readout. With a thin grating, the angular sensitivity to the alignment of the longitudinal axis of the substrate 10 to the input angle θi of incident radiation is reduced or eliminated. In particular, the input light can be oriented along substantially any angle θi with respect to the grating 12 without causing output signal degradation, due the large Bragg angle envelope. Also, if the incident beam 24 is normal to the substrate 10, the grating 12 can be oriented at any rotational (or azimuthal) angle without causing output signal degradation. However, in each of these cases, changing the incident angle θi will affect the output angle θo of the reflected light in a predetermined predictable way, thereby allowing for accurate output code signal detection or compensation.

Referring to FIG. 14, for a thin grating, in addition to multiplexing in the elevation or output angle based on grating pitch Λ, the bits can also be multiplexed in an azimuthal (or rotational) angle θa of the substrate. In particular, a plurality of gratings 750,752,754,756 each having the same pitch Λ are disposed in a surface 701 of the substrate 10 and located in the plane of the substrate surface 701. The input light 24 is incident on all the gratings 750,752,754,756 simultaneously. Each of the gratings provides output beams oriented based on the grating orientation. For example, the grating 750 provides the output beams 764,762, the grating 752 provides the output beams 766,768, the grating 754 provides the output beams 770,772, and the grating 756 provides the output beams 774,776. Each of the output beams provides spectral peaks or spots (similar to that discussed hereinbefore), which are located in a plane 760 that is parallel to the substrate surface plane 701. In this case, a single grating pitch Λ can produce many bits depending on the number of gratings that can be placed at different azimuthal (rotational) angles on the surface of the substrate 10 and the number of output beam spectral peaks that can be spatially and optically resolved/detected. Each bit may be viewed as the presence or absence of a pair of peaks located at a predetermined location in space in the plane 760. Note that this example uses only the m=+/−$1^{st}$ order for each reflected output beam. Alternatively, the detection may also use the m=+/−$2^{nd}$ order. In that case, there would be two additional output beams and peaks (not shown) for each grating (as discussed hereinbefore) that may lie in the same plane as the plane 760 and may be on a concentric circle outside the circle 760.

In addition, the azimuthal multiplexing can be combined with the elevation or output angle multiplexing discussed hereinbefore to provide two levels of multiplexing. Accordingly, for a thin grating, the number of bits can be multiplexed based on the number of grating pitches Λ and/or geometrically by the orientation of the grating pitches.

Furthermore, if the input light angle θi is normal to the substrate 10, the edges of the substrate 10 no longer scatter light from the incident angle into the "code angular space", as discussed herein and/or in the aforementioned patent application.

Also, in the thin grating geometry, a continuous broadband wavelength source may be used as the optical source if desired.

Referring to FIG. 15, instead of or in addition to the pitches Λ in the grating 12 being oriented normal to the longitudinal axis, the pitches may be created at a angle θg. In that case, when the input light 24 is incident normal to the surface 792, will produce a reflected output beam 790 having an angle θo determined by Eq. 1 as adjusted for the blaze angle θg. This can provide another level of multiplexing bits in the code.

Figure 16:
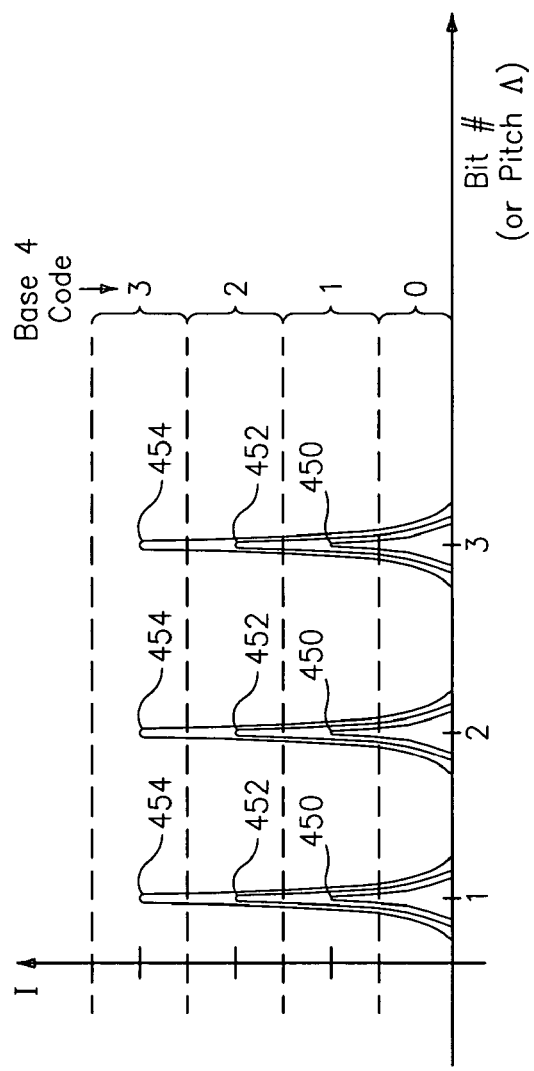
FIG. 16 is a graph of a plurality of states for each bit in a code for an optical identification element, in accordance with the present invention.

Referring to FIG. 16, instead of using an optical binary (0–1) code, an additional level of multiplexing may be provided by having the optical code use other numerical bases, if intensity levels of each bit are used to indicate code information. This could be achieved by having a corresponding magnitude (or strength) of the refractive index change (δn) for each grating pitch Λ. Four intensity ranges are shown for each bit number or pitch Λ, providing for a Base-4 code (where each bit corresponds to 0, 1, 2, or 3). The lowest intensity level, corresponding to a 0, would exist when this pitch Λ is not present in the grating 12. The next intensity level 450 would occur when a first low level δn1 exists in the grating that provides an output signal within the intensity range corresponding to a 1. The next intensity level 452 would occur when a second higher level δn2 exists in the grating 12 that provides an output signal within the intensity range corresponding to a 2. The next intensity level 454, would occur when a third higher level δn3 exists in the grating 12 that provides an output signal within the intensity range corresponding to a 3.

Figure 17:
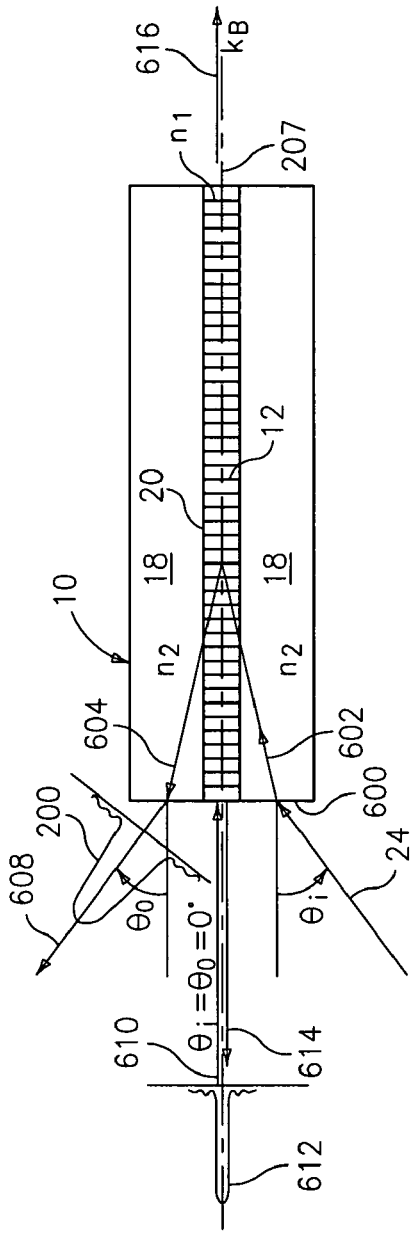
FIG. 17 is a side view of an optical identification element where light is incident on an end face, in accordance with the present invention.

Referring to FIG. 17, the input light 24 may be incident on the substrate 10 on an end face 600 of the substrate 10. In that case, the input light 24 will be incident on the grating 12 having a more significant component of the light (as compared to side illumination discussed hereinbefore) along the longitudinal grating axis 207 of the grating (along the grating vector $k_B$), as shown by a line 602. The light 602 reflects off the grating 12 as indicated by a line 604 and exits the substrate as output light 608. Accordingly, it should be understood by one skilled in the art that the diffraction equations discussed hereinbefore regarding output diffraction angle θo also apply in this case except that the reference axis would now be the grating axis 207. Thus, in this case, the input and output light angles θi,θo, would be measured from the grating axis 207 and length Lg of the grating 12 would become the thickness or depth D of the grating 12. As a result, a grating 12 that is 400 microns long, would result in the Bragg envelope 200 being narrow. It should be understood that because the values of n1 and n2 are close to the same value, the slight angle changes of the light between the regions 18,20 are not shown herein.

In the case where incident light 610 is incident along the same direction as the grating vector (Kb) 207, i.e., θi=0 degrees, the incident light sees the whole length Lg of the grating 12 and the grating provides a reflected output light angle θo=0 degrees, and the Bragg envelope 612 becomes extremely narrow, as the narrowing effect discussed above reaches a limit. In that case, the relationship between a given pitch Λ in the grating 12 and the wavelength of reflection λ is governed by a known "Bragg grating" relation:

$$\lambda = 2\, n_{eff} \Lambda \qquad \text{Eq. 8}$$

where $n_{eff}$ is the effective index of refraction of the substrate, λ is the input (and output wavelength) and Λ is the pitch. This relation, as is known, may be derived from Eq. 1 where θi=θo=90 degrees.

In that case, the code information is readable only in the spectral wavelength of the reflected beam, similar to that discussed hereinbefore for wavelength based code reading. Accordingly, the input signal in this case may be a scanned wavelength source or a broadband wavelength source. In addition, as discussed hereinbefore for wavelength based code reading, the code information may be obtained in reflection from the reflected beam 614 or in transmission by the transmitted beam 616 that passes through the grating 12.

It should be understood that for shapes of the substrate 10 or element 8 other than a cylinder, the effect of various different shapes on the propagation of input light through the element 8, substrate 10, and/or grating 12, and the associated reflection angles, can be determined using known optical physics including Snell's Law, shown below:

$$n_{in} \sin\theta_{in} = n_{out} \sin\theta_{out} \qquad \text{Eq. 9}$$

where $n_{in}$ is the refractive index of the first (input) medium, and $n_{out}$ is the refractive index of the second (output) medium, and θin and θout are measured from a line 620 normal to an incident surface 622.

Figures 18, 19:
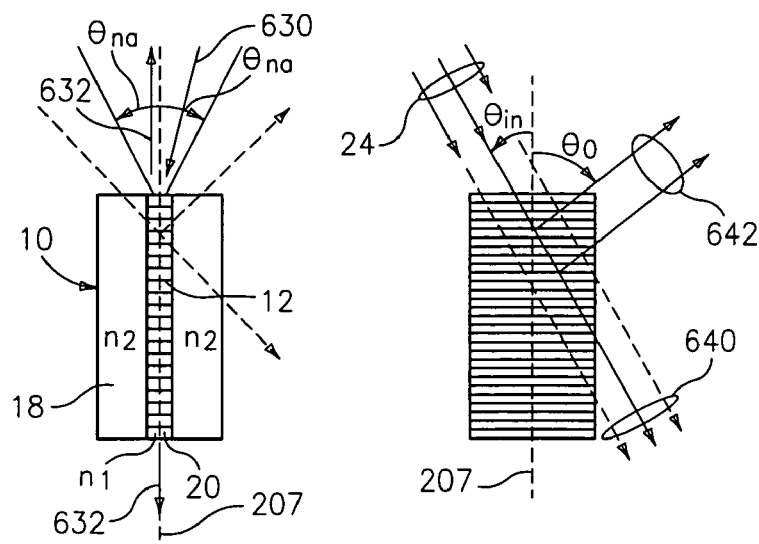
FIGS. 18–19 are side views of an optical identification element where light is incident on an end face, in accordance with the present invention.

Referring to FIG. 18, if the value of n1 in the grating region 20 is greater than the value of n2 in the non-grating region 18, the grating region 20 of the substrate 10 will act as a known optical waveguide for certain wavelengths. In that case, the grating region 20 acts as a "core" along which light is guided and the outer region 18 acts as a "cladding" which helps confine or guide the light. Also, such a waveguide will have a known "numerical aperture" (θna) that will allow light 630 that is within the aperture θna to be directed or guided along the grating axis 207 and reflected axially off the grating 12 and returned and guided along the waveguide. In that case, the grating 12 will reflect light having the appropriate wavelengths equal to the pitches Λ present in the grating 12 back along the region 20 (or core) of the waveguide, and pass the remaining wavelengths of light as the light 632. Thus, having the grating region 20 act as an optical waveguide for wavelengths reflected by the grating 12 allows incident light that is not aligned exactly with the grating axis 207 to be guided along and aligned with the grating 12 axis 207 for optimal grating reflection.

If an optical waveguide is used any standard waveguide may be used, e.g., a standard telecommunication single mode optical fiber (125 micron diameter or 80 micron diameter fiber with about a 8–10 micron diameter), or a larger diameter waveguide (greater than 0.5 mm diameter), such as is describe in U.S. patent application Ser. No. 09/455,868, filed Dec. 6, 1999, entitled "Large Diameter Waveguide, Grating". Further, any type of optical waveguide may be used for the optical substrate 10, such as, a multi-mode, birefringent, polarization maintaining, polarizing, multi-core, multi-cladding, or microsturctured optical waveguide, or a flat or planar waveguide (where the waveguide is rectangular shaped), or other waveguides.

Referring to FIG. 19, if the grating 12 extends across the entire dimension D of the substrate, the substrate 10 does not behave as a waveguide for the incident or reflected light and the incident light 24 will be diffracted (or reflected) as indicated by lines 642, and the codes detected as discussed hereinbefore for the end-incidence condition discussed hereinbefore with FIG. 45, and the remaining light 640 passes straight through.

Figure 20:
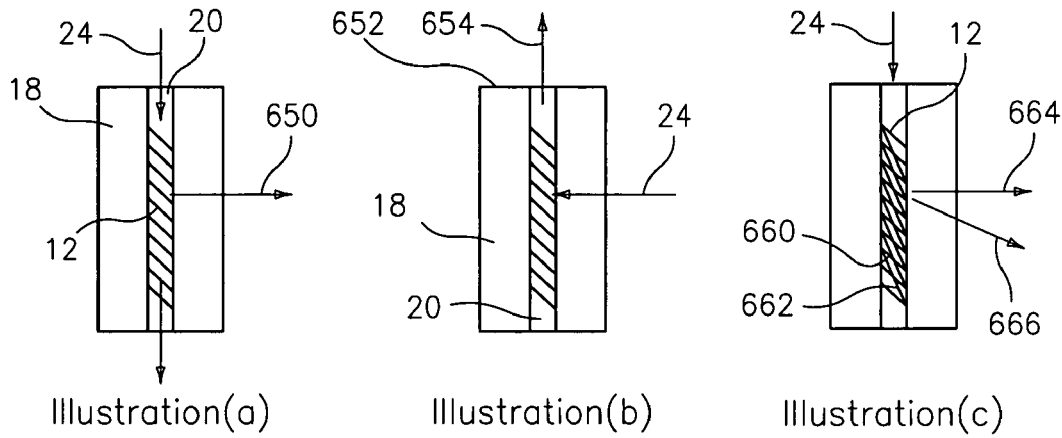
FIG. 20, illustrations (a)–(c) are side views of an optical identification element having a blazed grating, in accordance with the present invention.

Referring to FIG. 20, illustrations (a)–(c), in illustration (a), for the end illumination condition, if a blazed or angled grating is used, as discussed hereinbefore, the input light 24 is coupled out of the substrate 10 at a known angle as shown by a line 650. Referring to FIG. 20, illustration (b), alternatively, the input light 24 may be incident from the side and, if the grating 12 has the appropriate blaze angle, the reflected light will exit from the end face 652 as indicated by a line 654. Referring to FIG. 20, illustration (c), the grating 12 may have a plurality of different pitch angles 660,662, which reflect the input light 24 to different output angles as indicated by lines 664, 666. This provides another level of multiplexing (spatially) additional codes, if desired.

The grating 12 may be impressed in the substrate 10 by any technique for writing, impressed, embedded, imprinted, or otherwise forming a diffraction grating in the volume of or on a surface of a substrate 10. Examples of some known techniques are described in U.S. Pat. Nos. 4,725,110 and 4,807,950, entitled "Method for Impressing Gratings Within Fiber Optics", to Glenn et al; and U.S. Pat. No. 5,388,173, entitled "Method and Apparatus for Forming Aperiodic Gratings in Optical Fibers", to Glenn, respectively, and U.S. Pat. No. 5,367,588, entitled "Method of Fabricating Bragg Gratings Using a Silica Glass Phase Grating Mask and Mask Used by Same", to Hill, and U.S. Pat. No. 3,916,182, entitled "Periodic Dielectric Waveguide Filter", Dabby et al, and U.S. Pat. No. 3,891,302, entitled "Method of Filtering Modes in Optical Waveguides", to Dabby et al, which are all incorporated herein by reference to the extent necessary to understand the present invention.

Alternatively, instead of the grating 12 being impressed within the substrate material, the grating 12 may be partially or totally created by etching or otherwise altering the outer surface geometry of the substrate to create a corrugated or varying surface geometry of the substrate, such as is described in U.S. Pat. No. 3,891,302, entitled "Method of Filtering Modes in Optical Waveguides", to Dabby et al, which is incorporated herein by reference to the extent necessary to understand the present invention, provided the resultant optical refractive profile for the desired code is created.

Further, alternatively, the grating 12 may be made by depositing dielectric layers onto the substrate, similar to the way a known thin film filter is created, so as to create the desired resultant optical refractive profile for the desired code.

The substrate 10 (and/or the element 8) may have end-view cross-sectional shapes other than circular, such as square, rectangular, elliptical, clam-shell, D-shaped, or other shapes, and may have side-view sectional shapes other than rectangular, such as circular, square, elliptical, clam-shell, D-shaped, or other shapes. Also, 3D geometries other than a cylinder may be used, such as a sphere, a cube, a pyramid or any other 3D shape. Alternatively, the substrate 10 may have a geometry that is a combination of one or more of the foregoing shapes.

The shape of the element 8 and the size of the incident beam may be made to minimize any end scatter off the end face(s) of the element 8, as is discussed herein and/or in the aforementioned patent application. Accordingly, to minimize such scatter, the incident beam 24 may be oval shaped where the narrow portion of the oval is smaller than the diameter D1, and the long portion of the oval is smaller than the length L of the element 8. Alternatively, the shape of the end faces may be rounded or other shapes or may be coated with an antireflective coating.

It should be understood that the size of any given dimension for the region 20 of the grating 12 may be less than any corresponding dimension of the substrate 10. For example, if the grating 12 has dimensions of length Lg, depth Dg, and width Wg, and the substrate 12 has different dimensions of length L, depth D, and width W, the dimensions of the grating 12 may be less than that of the substrate 12. Thus, the grating 12, may be embedded within or part of a much larger substrate 12. Also, the element 8 may be embedded or formed in or on a larger object for identification of the object.

The dimensions, geometries, materials, and material properties of the substrate 10 are selected such that the desired optical and material properties are met for a given application. The resolution and range for the optical codes are scalable by controlling these parameters as discussed herein and/or in the aforementioned patent application.

Referring to FIG. 21, the substrate 10 may have an outer coating 799, such as a polymer or other material that may be dissimilar to the material of the substrate 10, provided that the coating 799 on at least a portion of the substrate, allows sufficient light to pass through the substrate for adequate optical detection of the code. The coating 799 may be on any one or more sides of the substrate 10. Also, the coating 799 may be a material that causes the element 8 to float or sink in certain fluids (liquid and/or gas) solutions.

Also, the substrate 10 may be made of a material that is less dense than certain fluid (liquids and/or gas) solutions, thereby allowing the elements 8 to float or be buoyant or partially buoyant. Also, the substrate may be made of a porous material, such as controlled pore glass (CPG) or other porous material, which may also reduce the density of the element 8 and may make the element 8 buoyant or partially-buoyant in certain fluids.

Figure 22:
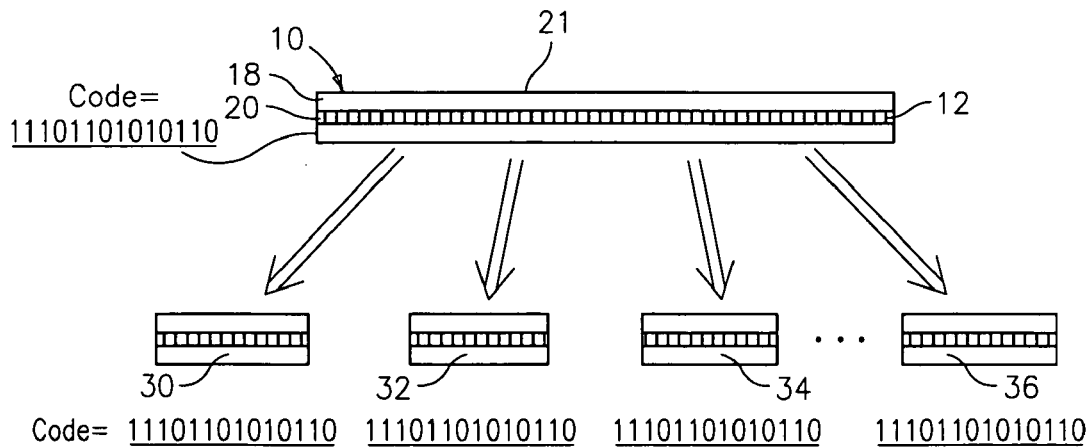
FIG. 22 is a side view of whole and partitioned optical identification element, in accordance with the present invention.

Referring to FIG. 22, the grating 12 is axially spatially invariant. As a result, the substrate 10 with the grating 12 (shown as a long substrate 21) may be axially subdivided or cut into many separate smaller substrates 30–36 and each substrate 30–36 will contain the same code as the longer substrate 21 had before it was cut. The limit on the size of the smaller substrates 30–36 is based on design and performance factors discussed herein and/or in the aforementioned patent application.

Referring to FIG. 23, one purpose of the outer region 18 (or region without the grating 12) of the substrate 10 is to provide mechanical or structural support for the inner grating region 20. Accordingly, the entire substrate 10 may comprise the grating 12, if desired. Alternatively, the support portion may be completely or partially beneath, above, or along one or more sides of the grating region 20, such as in a planar geometry, or a D-shaped geometry, or other geometries, as described herein and/or in the aforementioned patent application. The non-grating portion 18 of the substrate 10 may be used for other purposes as well, such as optical lensing effects or other effects (discussed herein or in the aforementioned patent application). Also, the end faces of the substrate 10 need not be perpendicular to the sides or parallel to each other. However, for applications where the elements 8 are stacked end-to-end, the packing density may be optimized if the end faces are perpendicular to the sides.

Referring to FIG. 24, illustrations (a)–(c), two or more substrates 10,250, each having at least one grating therein, may be attached together to form the element 8, e.g., by an adhesive, fusing or other attachment techniques. In that case, the gratings 12,252 may have the same or different codes.

Referring to FIG. 25, illustrations (a) and (b), the substrate 10 may have multiple regions 80,90 and one or more of these regions may have gratings in them. For example, there may be gratings 12,252 side-by-side (illustration (a)), or there may be gratings 82–88, spaced end-to-end (illustration (b)) in the substrate 10.

Referring to FIG. 26, the length L of the element 8 may be shorter than its diameter D, thus, having a geometry such as a plug, puck, wafer, disc or plate.

Referring to FIG. 27, to facilitate proper alignment of the grating axis with the angle θi of the input beam 24, the substrate 10 may have a plurality of the gratings 12 having the same codes written therein at numerous different angular or rotational (or azimuthal) positions of the substrate 10. In particular, two gratings 550, 552, having axial grating axes 551, 553, respectively may have a common central (or pivot or rotational) point where the two axes 551,553 intersect. The angle θi of the incident light 24 is aligned properly with the grating 550 and is not aligned with the grating 552, such that output light 555 is reflected off the grating 550 and light 557 passes through the grating 550 as discussed herein. If the element 8 is rotated as shown by the arrows 559, the angle θi of incident light 24 will become aligned properly with the grating 552 and not aligned with the grating 550 such that output light 555 is reflected off the grating 552 and light 557 passes through the grating 552. When multiple gratings are located in this rotational orientation, the bead may be rotated as indicated by a line 559 and there may be many angular positions that will provide correct (or optimal) incident input angles θi to the grating. While this example shows a circular cross-section, this technique may be used with any shape cross-section.

Referring to FIG. 28, illustrations (a), (b), (c), (d), and (e) the substrate 10 may have one or more holes located within the substrate 10. In illustration (a), holes 560 may be located at various points along all or a portion of the length of the substrate 10. The holes need not pass all the way through the substrate 10. Any number, size and spacing for the holes 560 may be used if desired. In illustration (b), holes 572 may be located very close together to form a honeycomb-like area of all or a portion of the cross-section. In illustration (c), one (or more) inner hole 566 may be located in the center of the substrate 10 or anywhere inside of where the grating region (s) 20 are located. The inner hole 566 may be coated with a reflective coating 573 to reflect light to facilitate reading of one or more of the gratings 12 and/or to reflect light diffracted off one or more of the gratings 12. The incident light 24 may reflect off the grating 12 in the region 20 and then reflect off the surface 573 to provide output light 577. Alternatively, the incident light 24 may reflect off the surface 573, then reflect off the grating 12 and provide the output light 575. In that case the grating region 20 may run axially or circumferentially 571 around the substrate 10. In illustration (d), the holes 579 may be located circumferentially around the grating region 20 or transversely across the substrate 10. In illustration (e), the grating 12 may be located circumferentially around the outside of the substrate 10, and there may be holes 574 inside the substrate 10. In that case, the incident light 24 reflects off the grating 12 to provide the optical light 576.

Referring to FIG. 29, illustrations (a), (b), and (c), the substrate 10 may have one or more protruding portions or teeth 570, 578,580 extending radially and/or circumferentially from the substrate 10. Alternatively, the teeth 570, 578,580 may have any other desired shape.

Referring to FIG. 30, illustrations (a), (b), (c) a D-shaped substrate, a flat-sided substrate and an eye-shaped (or clamshell or teardrop shaped) substrate 10, respectively, are shown. Also, the grating region 20 may have end cross-sectional shapes other than circular and may have side cross-sectional shapes other than rectangular, such as any of the geometries described herein for the substrate 10. For example, the grating region 20 may have a oval cross-sectional shape as shown by dashed lines 581, which may be oriented in a desired direction, consistent with the teachings herein. Any other geometries for the substrate 10 or the grating region 20 may be used if desired, as described herein.

Figure 31:
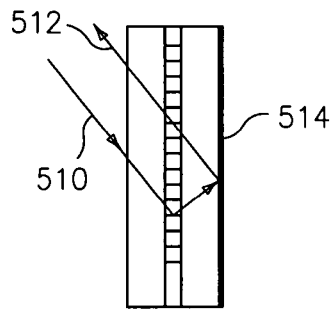
FIG. 31 is a side view an optical identification element having a reflective coating thereon, in accordance with the present invention.

Referring to FIG. 31, at least a portion of a side of the substrate 10 may be coated with a reflective coating 514 to allow incident light 510 to be reflected back to the same side from which the incident light came, as indicated by reflected light 512.

Figure 32:
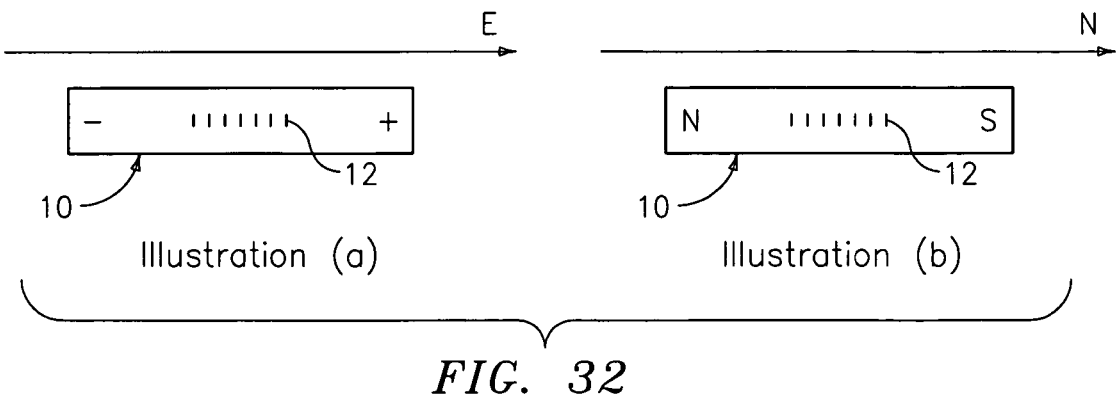
FIG. 32 illustrations (a)–(b) are side views of an optical identification element polarized along an electric or magnetic field, in accordance with the present invention.

Referring to FIG. 32, illustrations (a) and (b), alternatively, the substrate 10 can be electrically and/or magnetically polarized, by a dopant or coating, which may be used to ease handling and/or alignment or orientation of the substrate 10 and/or the grating 12, or used for other purposes. Alternatively, the bead may be coated with conductive material, e.g., metal coating on the inside of a holy substrate, or metallic dopant inside the substrate. In these cases, such materials can cause the substrate 10 to align in an electric or magnetic field. Alternatively, the substrate can be doped with an element or compound that fluoresces or glows under appropriate illumination, e.g., a rare earth dopant, such as Erbium, or other rare earth dopant or fluorescent or luminescent molecule. In that case, such fluorescence or luminescence may aid in locating and/or aligning substrates.

Unless otherwise specifically stated herein, the term "microbead" is used herein as a label and does not restrict any embodiment or application of the present invention to certain dimensions, materials and/or geometries.

The dimensions and/or geometries for any of the embodiments described herein are merely for illustrative purposes and, as such, any other dimensions and/or geometries may be used if desired, depending on the application, size, performance, manufacturing requirements, or other factors, in view of the teachings herein.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An optical identification element having a synthesized chemical attached thereto, comprising:
    an optical substrate;
    at least a portion of said substrate being made of a substantially single material and having at least one diffraction grating embedded therein, said grating having a resultant refractive variation within the substantially single material at a grating location;
    said grating providing an output optical signal indicative of a code when illuminated by an incident light signal propagating from outside the substrate, said output optical signal being a result of passive, non-resonant scattering from said grating when illuminated by said incident light signal; and
    the synthesized chemical being attached to at least a portion of said substrate.

2. The apparatus of claim 1 wherein said refractive index variation comprises at least one refractive index pitch superimposed at said grating location.

3. The apparatus of claim 1 wherein said refractive index variation comprises a plurality of refractive index pitches superimposed at said grating location.

4. The apparatus of claim 1 wherein said substrate is made of a material selected from the group: glass, silica, plastic, rubber, and polymer.

5. The apparatus of claim 1 wherein said code comprises a plurality of digital bits.

6. The apparatus of claim 1 wherein said code comprises at least a predetermined number of bits, said number being: 3, 5, 7, 9, 10, 12, 14, 16, 18, 20, 24, 28, 30, 40, 50, or 100.

7. The apparatus of claim 1 wherein said code comprises a plurality of bits, each bit having a plurality of states.

8. The apparatus of claim 1 wherein said code comprises a plurality of bits, each bit having a corresponding spatial location in said output optical signal and each bit in said code having a value related to the intensity of said output optical signal at the spatial location of each bit.

9. The apparatus of claim 8 wherein the value of each bit corresponds to the magnitude of refractive index variation of a corresponding refractive index pitch in said grating.

10. The apparatus of claim 1 wherein said code comprises a plurality of digital bits, each bit having a corresponding spatial location in said output optical signal and each bit in said code having a binary value related to the intensity of said output optical signal at the spatial location of each bit.

11. The apparatus of claim 10 wherein the value of each bit corresponds to the presence or absence of a corresponding refractive index pitch in said grating.

12. The apparatus of claim 1 wherein said incident light comprises a single wavelength.

13. The apparatus of claim 1 wherein said substrate has a coating disposed on at least a portion of said substrate, at least a portion of said coating being made of a material that allows sufficient amount of said incident light signal to pass through said material to allow detection of said code.

14. The apparatus of claim 1 wherein said substrate has a coating material disposed on at least a portion of said substrate, said coating comprising a polymer.

15. The apparatus of claim 1 wherein at least a portion of said substrate has a 3-D shape selected from the group: a cylinder, a sphere, a cube, and a pyramid.

16. The apparatus of claim 1 wherein said substrate has a grating region where said grating is located and a non-grating region where said grating is not located; and wherein said substrate has a plurality of grating regions.

17. The apparatus of claim 1 wherein said substrate has a grating region where said grating is located and a non-grating region where said grating is not located; and wherein said grating region has a refractive index that is greater than that of said non-grating region.

18. The apparatus of claim 1 wherein said substrate has a grating region where said grating is located and a non-grating region where said grating is not located; and wherein said grating region has a refractive index that is not greater than that of said non-grating region.

19. The apparatus of claim 1 wherein said incident light is incident on said substrate along a longitudinal grating axis of said grating.

20. The apparatus of claim 1 wherein said incident light is incident on said substrate at an angle to a longitudinal grating axis of said grating.

21. The apparatus of claim 1 wherein said grating comprises a thin grating or a blazed grating.

22. The apparatus of claim 1 wherein said substrate comprises a plurality of said gratings.

23. The apparatus of claim 1 wherein said substrate comprises a plurality of said gratings each at different locations within said substrate.

24. The apparatus of claim 1 wherein said substrate comprises a particle or bead.

25. The apparatus of claim 1 wherein said chemical comprises at least one gene, nucleotide, protein, antibody, antigen, peptide, amino acid, DNA, cDNA, RNA, nucleic acid, polymer, cell, hydrocarbon, atom, or portion thereof.

26. The apparatus of claim 1 wherein said chemical is synthesized using a split-and-pool technique.

27. A method of synthesizing a chemical on a substrate, comprising:
    obtaining at least one substrate, at least a portion of said substrate being made of a substantially single material, and each having at least one diffraction grating embedded therein, said grating having a resultant refractive variation within the substantially single material at a grating location,
    said grating providing an output optical signal indicative of a code when illuminated by an incident light signal propagating from outside the substrate, said output optical signal being a result of passive, non-resonant scattering from said grating when illuminated by said incident light signal; and
    synthesizing the chemical attached to at least a portion of said substrate.

28. The method of claim 27 comprising a plurality of said substrates.

29. The method of claim 27 wherein said synthesizing is performed using a split-and-pool technique.

30. The method of claim 27 wherein said chemical has predetermined chemical components and comprising attaching predetermined ones of said components to corresponding predetermined ones of said substrates in a predetermined order.

31. The method of claim 30 comprising combining said substrates together in a common container after each of said components are attached to said substrates.

32. The method of claim 30 comprising sorting said substrates by said code after each of said components are attached to said substrates.

33. The method of claim 30 wherein said chemical comprises a nucleic acid and said components at least include bases: G, C, A and T.

34. The method of claim 27 wherein said refractive index variation comprises at least one refractive index pitch superimposed at said grating location.

35. The method of claim 27 wherein said refractive index variation comprises a plurality of refractive index pitches superimposed at said grating location.

36. The method of claim 27 wherein said substrate is made of a material selected from the group: glass, silica, plastic, rubber, and polymer.

37. The method of claim 27 wherein said code comprises a plurality of digital bits.

38. The method of claim 27 wherein said code comprises at least a predetermined number of bits, said number being: 3, 5, 7, 9, 10, 12, 14, 16, 18, 20, 24, 28, 30, 40, 50, or 100.

39. The method of claim 27 wherein said code comprises a plurality of bits, each bit having a plurality of states.

40. The method of claim 27 wherein said code comprises a plurality of bits, each bit having a corresponding spatial location in said output optical signal and each bit in said code having a value related to the intensity of said output optical signal at the spatial location of each bit.

41. The method of claim 40 wherein the value of each bit corresponds to the magnitude of refractive index variation of a corresponding refractive index pitch in said grating.

42. The method of claim 27 wherein said code comprises a plurality of digital bits, each bit having a corresponding spatial location in said output optical signal and each bit in said code having a binary value related to the intensity of said output optical signal at the spatial location of each bit.

43. The method of claim 42 wherein the value of each bit corresponds to the presence or absence of a corresponding refractive index pitch in said grating.

44. The method of claim 27 wherein said incident light comprises a single wavelength.

45. The method of claim 27 wherein said substrate has a coating disposed on at least a portion of said substrate, at least a portion of said coating being made of a material that allows sufficient amount of said incident light signal to pass through said material to allow detection of said code.

46. The method of claim 27 wherein said substrate has a coating material disposed on at least a portion of said substrate, said coating comprising a polymer.

47. The method of claim 27 wherein at least a portion of said substrate has a 3-D shape selected from the group: a cylinder, a sphere, a cube, and a pyramid.

48. The method of claim 27 wherein said substrate has a grating region where said grating is located and a non-grating region where said grating is not located; and wherein said substrate has a plurality of grating regions.

49. The method of claim 27 wherein said substrate has a grating region where said grating is located and a non-grating region where said grating is not located; and wherein said grating region has a refractive index that is greater than that of said non-grating region.

50. The method of claim 27 wherein said substrate has a grating region where said grating is located and a non-grating region where said grating is not located; and wherein said grating region has a refractive index that is not greater than that of said non-grating region.

51. The method of claim 27 wherein said incident light is incident on said substrate along a longitudinal grating axis of said grating.

52. The method of claim 27 wherein said incident light is incident on said substrate at an angle to a longitudinal grating axis of said grating.

53. The method of claim 27 wherein said grating comprises a thin grating or a blazed grating.

54. The method of claim 27 wherein said substrate comprises a plurality of said gratings.

55. The method of claim 27 wherein said substrate comprises a plurality of said gratings each at different locations within said substrate.

56. The method of claim 27 wherein said substrate comprises a particle or bead.

57. The method of claim 27 wherein said chemical comprises at least one gene, nucleotide, protein, antibody, antigen, peptide, amino acid, DNA, cDNA, RNA, nucleic acid, polymer, cell, hydrocarbon, atom, or portion thereof.

* * * * *